US009540189B2

(12) United States Patent
Chau et al.

(10) Patent No.: US 9,540,189 B2
(45) Date of Patent: *Jan. 10, 2017

(54) ADHESIVE DISPENSING DEVICE HAVING OPTIMIZED CYCLONIC SEPARATOR UNIT

(71) Applicant: Nordson Corporation, Westlake, OH (US)

(72) Inventors: Sing Yi Chau, Atlanta, GA (US); Justin A. Clark, Suwanee, GA (US); William M. Ridge, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/862,782

(22) Filed: Sep. 23, 2015

(65) Prior Publication Data

US 2016/0009504 A1 Jan. 14, 2016

Related U.S. Application Data

(63) Continuation of application No. 13/799,788, filed on Mar. 13, 2013, now Pat. No. 9,169,088.

(Continued)

(51) Int. Cl.
*B65G 53/60* (2006.01)
*B65G 53/16* (2006.01)
(Continued)

(52) U.S. Cl.
CPC ................ *B65G 53/16* (2013.01); *B04C 5/04* (2013.01); *B04C 5/13* (2013.01); *B04C 9/00* (2013.01);
(Continued)

(58) Field of Classification Search
None
See application file for complete search history.

(56) References Cited

U.S. PATENT DOCUMENTS 2,672,215 A 3/1954 Otto et al.
2,744,792 A 5/1956 Finn et ei.
(Continued)

FOREIGN PATENT DOCUMENTS

CN 202116049 U 1/2012
DE 3815089 A1 11/1989
(Continued)

OTHER PUBLICATIONS

Fluid-Air Products Inc., InvisiPac, Jan. 5, 2013.
(Continued)

*Primary Examiner* — William R Harp
(74) *Attorney, Agent, or Firm* — Baker & Hostetler LLP

(57) ABSTRACT

An adhesive dispensing device includes a heater unit for melting adhesive material, a receiving space for feeding the heater unit, and a cyclonic separator unit for delivering adhesive pellets to the receiving space. The cyclonic separator unit includes a tangential inlet pipe proximate to a top end of a generally cylindrical pipe, which is connected to the receiving space at an open bottom end. The tangential or spiral flow of air and adhesive pellets generated through the cyclonic separator unit reduces the speed of the air and adhesive pellets to avoid splashing of molten adhesive material while maintaining enough speed to avoid adhesive build up on the generally cylindrical pipe.

13 Claims, 9 Drawing Sheets

Related U.S. Application Data

(60) Provisional application No. 61/703,458, filed on Sep. 20, 2012.

(51) Int. Cl.

| | | |
|---|---|---|
| *B65G 53/40* | (2006.01) | |
| *B04C 5/04* | (2006.01) | |
| *B04C 5/13* | (2006.01) | |
| *B05C 11/10* | (2006.01) | |
| *B29B 13/02* | (2006.01) | |
| *B05C 5/02* | (2006.01) | |
| *B65G 53/58* | (2006.01) | |
| *B04C 9/00* | (2006.01) | |

(52) U.S. Cl.
CPC ......... *B05C 5/0225* (2013.01); *B05C 11/1042* (2013.01); *B29B 13/022* (2013.01); *B65G 53/40* (2013.01); *B65G 53/58* (2013.01); *B65G 53/60* (2013.01); *B04C 2009/004* (2013.01)

(56) References Cited

U.S. PATENT DOCUMENTS

| | | |
|---|---|---|
| 2,824,335 A | 2/1958 | Moffat et al. |
| 2,868,015 A | 1/1959 | Haropulos et al. |
| 3,030,153 A | 4/1962 | Krenke et al. |
| 3,219,394 A | 11/1965 | Moss et al. |
| 3,377,861 A | 4/1968 | Sherwood et al. |
| 3,580,644 A | 5/1971 | Ballard et al. |
| 3,756,456 A | 9/1973 | Georgi |
| 3,773,069 A | 11/1973 | Rebentisch |
| 3,981,416 A | 9/1976 | Scholl |
| 4,084,628 A | 4/1978 | Schmid |
| 4,086,466 A | 4/1978 | Scharlack |
| 4,277,773 A | 7/1981 | Blatnik |
| 4,417,675 A | 11/1983 | Abt et al. |
| 4,437,581 A | 3/1984 | Coker |
| 4,441,450 A | 4/1984 | Dettelbach et al. |
| 4,474,311 A | 10/1984 | Petrecca |
| 4,479,600 A | 10/1984 | Albright |
| 4,482,367 A | 11/1984 | Howeth |
| 4,583,885 A | 4/1986 | Thiele |
| 4,688,432 A | 8/1987 | Marsh |
| 4,821,922 A | 4/1989 | Miller et al. |
| 4,850,425 A | 7/1989 | Anderson |
| 4,898,527 A | 2/1990 | Claassen |
| 4,994,984 A | 2/1991 | Massimo |
| 5,006,018 A | 4/1991 | Depew |
| 5,174,472 A | 12/1992 | Raque et al. |
| 5,287,086 A | 2/1994 | Gibb |
| 5,294,218 A | 3/1994 | Fiorentini et al. |
| 5,332,366 A | 7/1994 | Anderson |
| 5,347,867 A | 9/1994 | Pangerl |
| 5,589,203 A | 12/1996 | Sato |
| 5,680,961 A | 10/1997 | Boccagno et al. |
| 5,715,972 A | 2/1998 | Siddiqui |
| 5,747,689 A | 5/1998 | Hampo et al. |
| 5,791,830 A | 8/1998 | Fort et al. |
| 5,909,829 A | 6/1999 | Wegman et al. |
| 6,039,513 A | 3/2000 | Law |
| 6,073,488 A | 6/2000 | Byatt et al. |
| 6,095,803 A | 8/2000 | Slater |
| 6,175,101 B1 | 1/2001 | Miller et al. |
| 6,230,936 B1 | 5/2001 | Lasko |
| 6,352,173 B1 | 3/2002 | Duckworth |
| 6,471,751 B1 | 10/2002 | Semanderes et al. |
| 6,616,721 B2 | 9/2003 | Oh |
| 7,263,781 B2 | 9/2007 | Sielemann |
| 7,626,143 B2 | 12/2009 | Miller |
| 8,157,483 B2 | 4/2012 | Volkmann |
| 8,201,717 B2 | 6/2012 | Varga et al. |
| 8,383,991 B2 | 2/2013 | Ganzer et al. |
| 8,430,230 B1 | 4/2013 | Ferguson et al. |
| 8,580,006 B2 | 11/2013 | LaCroix et al. |
| 2002/0079325 A1 | 6/2002 | Estelle |
| 2003/0021700 A1 | 1/2003 | Serafin et al. |
| 2003/0080154 A1 | 5/2003 | Jeter |
| 2003/0080156 A1 | 5/2003 | Jeter et al. |
| 2004/0167738 A1 | 8/2004 | Miller |
| 2005/0274740 A1 | 12/2005 | Duckworth et al. |
| 2006/0055503 A1 | 3/2006 | Tanida |
| 2006/0159565 A1 | 7/2006 | Sanwald |
| 2007/0080157 A1 | 4/2007 | Mehaffy et al. |
| 2007/0216424 A1 | 9/2007 | Sieh et al. |
| 2008/0095637 A1 | 4/2008 | Burdi et al. |
| 2008/0120046 A1 | 5/2008 | Tung et al. |
| 2008/0145248 A1 | 6/2008 | Kato et al. |
| 2008/0156801 A1 | 7/2008 | Tung et al. |
| 2008/0196512 A1 | 8/2008 | Miller |
| 2008/0199323 A1 | 8/2008 | Bauck et al. |
| 2008/0206066 A1 | 8/2008 | Nguyen et al. |
| 2008/0282795 A1 | 11/2008 | Zabel et al. |
| 2008/0302477 A1 | 12/2008 | Varga et al. |
| 2009/0229359 A1 | 9/2009 | Reimelt et al. |
| 2009/0229683 A1 | 9/2009 | Baek et al. |
| 2009/0285983 A1 | 11/2009 | Baldauf et al. |
| 2010/0282088 A1 | 11/2010 | Deuber et al. |
| 2011/0000309 A1 | 1/2011 | Griffiths et al. |
| 2011/0002793 A1 | 1/2011 | Bauck et al. |
| 2011/0042408 A1 | 2/2011 | Giordano et al. |
| 2011/0079078 A1 | 4/2011 | Ho et al. |
| 2011/0100120 A1 | 5/2011 | Neuburger et al. |
| 2012/0051945 A1 | 3/2012 | Orndorff et al. |
| 2012/0227484 A1 | 9/2012 | Chen et al. |
| 2012/0247665 A1 | 10/2012 | Varga et al. |
| 2012/0273071 A1 | 11/2012 | Kai |
| 2013/0105003 A1 | 5/2013 | Quam et al. |
| 2013/0105004 A1 | 5/2013 | Tix et al. |
| 2013/0105005 A1 | 5/2013 | Tix et al. |
| 2013/0105039 A1 | 5/2013 | Tix et al. |
| 2013/0105517 A1 | 5/2013 | Tix et al. |
| 2013/0105526 A1 | 5/2013 | Ross et al. |
| 2013/0112279 A1 | 5/2013 | Ross et al. |
| 2013/0112280 A1 | 5/2013 | Quam et al. |
| 2013/0112294 A1 | 5/2013 | Ross et al. |
| 2013/0112312 A1 | 5/2013 | Ross et al. |
| 2013/0112709 A1 | 5/2013 | Ross et al. |
| 2013/0112710 A1 | 5/2013 | Ross et al. |
| 2013/0112711 A1 | 5/2013 | Lind et al. |
| 2013/0115016 A1 | 5/2013 | Ross et al. |
| 2013/0205893 A1 | 8/2013 | Shearer et al. |
| 2014/0020463 A1 | 1/2014 | Ikeya et al. |
| 2014/0116525 A1 | 5/2014 | Bondeson et al. |

FOREIGN PATENT DOCUMENTS

| | | |
|---|---|---|
| DE | 19923410 A1 | 11/1999 |
| DE | 10156691 A1 | 5/2003 |
| EP | 0072679 A1 | 2/1983 |
| EP | 1350743 B1 | 6/2006 |
| EP | 2119509 A2 | 11/2009 |
| FR | 1366936 A | 7/1964 |
| FR | 2787770 A1 | 6/2000 |
| GB | 1562562 A | 3/1980 |
| GB | 2485041 A | 5/2012 |
| WO | 9814314 A1 | 4/1998 |
| WO | 2007084891 A2 | 7/2007 |
| WO | 2009046545 A1 | 4/2009 |
| WO | 2012095838 A1 | 7/2012 |

OTHER PUBLICATIONS

Meltex Corporation; Product Information Sheet; Hot Melt Applicator MP 400; 1 page.
Meltex GmbH; Product Information Sheet; Hot Melt Applicator MX 2001; 2 pages.
Meltex GmbH; Product Information Sheet; Hot Melt Applicator MX 2003; 2 pages.
European Patent Office, Extended European Search Report in EP Patent Application No. 13185893.8, Apr. 1, 2015 (6 pages).

(56) References Cited

OTHER PUBLICATIONS

European Patent Office, Extended European Search Report in EP Patent Application No. 13185184, Jun. 6, 2014 (7 pages).
European Patent Office, European Search Report in corresponding European Patent Application No. 13184144.7 dated Mar. 25, 2014 (6 pages).
European Patent Office, Extended European Search Report in corresponding European Patent Application No. 13187639.3, dated Feb. 28, 2014 (5 pages).

ADHESIVE DISPENSING DEVICE HAVING OPTIMIZED CYCLONIC SEPARATOR UNIT

CROSS-REFERENCE TO RELATED APPLICATION

This application is a continuing application of, and claims the benefit of, U.S. patent application Ser. No. 13/799,788, now U.S. Pat. No. 9,169,088, filed on Mar. 13, 2013, which claimed the benefit of U.S. Provisional Patent Application Ser. No. 61/703,458, filed on Sep. 20, 2012, the disclosures of which are incorporated by reference herein in their entirety.

FIELD OF THE INVENTION

The present invention generally relates to an adhesive dispenser, and more particularly, to components of a melt subassembly that is configured to heat adhesive prior to dispensing.

BACKGROUND

A conventional dispensing device for supplying heated adhesive (i.e., a hot-melt adhesive dispensing device) generally includes an inlet for receiving adhesive materials in solid or liquid form, a heater grid in communication with the inlet for heating the adhesive materials, an outlet in communication with the heater grid for receiving the heated adhesive from the heated grid, and a pump in communication with the heater grid and the outlet for driving and controlling the dispensation of the heated adhesive through the outlet. One or more hoses may also be connected to the outlet to direct the dispensation of heated adhesive to adhesive dispensing guns or modules located downstream from the dispensing device. Furthermore, conventional dispensing devices generally include a controller (e.g., a processor and a memory) and input controls electrically connected to the controller to provide a user interface with the dispensing device. The controller is in communication with the pump, heater grid, and/or other components of the device, such that the controller controls the dispensation of the heated adhesive.

Conventional hot-melt adhesive dispensing devices typically operate at ranges of temperatures sufficient to melt the received adhesive and heat the adhesive to an elevated application temperature prior to dispensing the heated adhesive. In order to ensure that the demand for heated adhesive from the downstream gun(s) and module(s) is satisfied, the adhesive dispensing devices are designed with the capability to generate a predetermined maximum flow of molten adhesive. As throughput requirements increase (e.g., up to 20 lb/hour or more), adhesive dispensing devices traditionally have increased the size of the heater grid and the size of the hopper and reservoir associated with the heater grid in order to ensure that the maximum flow of molten adhesive can be supplied.

However, large hoppers and reservoirs result in a large amount of hot-melt adhesive being held at the elevated application temperature within the adhesive dispensing device. This holding of the hot-melt adhesive at the elevated application temperature may keep the hot-melt adhesive at high temperature for only about 1 to 2 hours during maximum flow, but most conventional adhesive dispensing devices do not operate continuously at the maximum flow. To this end, all adhesive dispensing devices operate with long periods of time where the production line is not in use and the demand for molten adhesive is zero, or lower than the maximum flow. During these periods of operation, large amounts of hot-melt adhesive may be held at the elevated application temperature for long periods of time, which can lead to degradation and/or charring of the adhesive, negative effects on the bonding characteristics of the adhesive, clogging of the adhesive dispensing device, and/or additional system downtime.

In addition, the supply of adhesive material into the hopper must also be monitored to maintain a generally consistent level of hot-melt adhesive in the adhesive dispensing device. Adhesive, generally in the form of small shaped pellets, is delivered to the hopper with pressurized air that flows through an inlet hose at a high velocity (the pellets move at about 70% of the speed of the air). In conventional adhesive dispensing devices in which the inlet hose is directly connected to the hopper, the high rate of pellet and air speed may cause splashing of molten adhesive that can build up and lead to blockages of either the inlet or the air exhaust at the hopper. The inlet and the air exhaust may include baffles to limit such splashing of molten material, but these baffles provide an additional surface area that molten material can build up on and cause blockages.

In other conventional adhesive dispensing devices, a tapered cyclonic separator unit may be located between an inlet hose and a hopper. The tapered cyclonic separator unit effectively slows or stops the flow of the air and allows the material moving within the air to be dropped by gravity into the hopper. When used with adhesive pellets, the tapered walls of the cyclonic separator unit slow down the flow of adhesive pellets by frictional engagement, but the high amount of frictional engagement with the adhesive pellets caused by the significant taper or angle of the walls may cause adhesive build up on the walls and the eventual clogging of the inlet at the end of the cyclonic separator unit.

For reasons such as these, an improved hot-melt adhesive dispenser device and cyclonic separator unit would be desirable.

SUMMARY OF THE INVENTION

According to one embodiment of the invention, a cyclonic separator unit for supplying air-driven adhesive pellets to a receiving space in an adhesive dispensing device includes a generally cylindrical pipe and a tangential inlet pipe. The generally cylindrical pipe includes a top end, a bottom end, and an interior surface extending from the top end to the bottom end. The bottom end is adapted to be coupled in fluid communication with the receiving space. The tangential inlet pipe is coupled to the generally cylindrical pipe proximate to the top end. The generally cylindrical pipe receives a flow of air and adhesive pellets through the tangential inlet pipe to cause a spiral flow of air and adhesive pellets along the interior surface. This spiral flow frictionally engages the interior surface, thereby reducing a speed of the flow of air and adhesive pellets to a lower non-zero speed before deposit within the receiving space. As a result, the air flow along the interior surface prevents build up of adhesive material on the generally cylindrical pipe, and the reduction of speed limits any splashing that may occur when the adhesive pellets are deposited in the receiving space.

In some embodiments, the cyclonic separator unit also includes a sidewall opening in the interior surface of the generally cylindrical pipe. The tangential inlet pipe is coupled to the generally cylindrical pipe at the sidewall opening. The cyclonic separator unit may also include an exhaust pipe extending into the generally cylindrical pipe from the closed top end. The exhaust pipe is configured to receive an air filter that filters exhaust air flow from the cyclonic separator unit. The exhaust pipe may be sized to have a diameter corresponding to the diameter of an inlet hose connected to the tangential inlet pipe, so that incoming and outgoing air flow is sufficiently enabled by similar-sized conduits. In other embodiments, the cyclonic separator unit includes a cyclone cap engaged with the top end of the generally cylindrical pipe, and this cyclone cap includes the tangential inlet pipe and the exhaust pipe. The cyclone cap is removable as a unit with the tangential inlet pipe and the exhaust pipe to provide access into the generally cylindrical pipe. To this end, the cyclone cap may also include a projecting flange with a retention lip groove. At least one retention clip located on the generally cylindrical pipe is configured to snap into engagement with the retention lip groove to retain the cyclone cap in position relative to the generally cylindrical pipe.

In one aspect, the generally cylindrical pipe encloses an interior cylindrical space having an inner central space portion including the exhaust pipe and an outer annular space portion surrounding the inner central space portion. The outer annular space portion receives the spiraling flow of air and adhesive pellets moving from the tangential inlet pipe to the bottom end. The inner central space portion receives exhaust flow of air moving from the receiving space at the bottom end to the exhaust pipe at the top end. At least a segment of the outer annular space portion surrounds the exhaust pipe, and this segment is where the flow of air and adhesive pellets is injected by the tangential inlet pipe such that the air and adhesive pellets initially spiral around the exhaust pipe. The exhaust pipe may further include a metal screen located adjacent to the air filter when the air filter is inserted into the exhaust pipe, in certain embodiments.

In another aspect, the generally cylindrical pipe defines an inner diameter that remains constant in size from the top end to the bottom end. Alternatively, the generally cylindrical pipe may define a first inner diameter at the top end which is larger than a second inner diameter at the bottom end, thereby providing a slight tapering of the generally cylindrical pipe. More specifically, the first inner diameter is less than 150% the size of the second inner diameter so that only a gentle taper is introduced. Accordingly, the interior sidewall of the generally cylindrical pipe does not directly oppose the gravitational forces applied to the adhesive pellets as the flow of air and adhesive pellets moves through the cyclonic separator unit.

In another embodiment according to the invention, an adhesive dispensing device includes a heater unit for melting and heating adhesive material to an elevated application temperature, a receiving space defined by at least one sidewall and positioned to feed adhesive material through the heater unit, and a cyclonic separator unit configured to receive pellets of adhesive in an air flow and reduce the speed of the air flow and the pellets of adhesive before depositing the pellets of adhesive material into the receiving space. As described in detail above, this cyclonic separator unit again includes a generally cylindrical pipe extending from a top end to a bottom end and a tangential inlet pipe connected to the generally cylindrical pipe proximate the top end. The flow of air and adhesive pellets is injected into the generally cylindrical pipe so as to cause spiral flow along an interior surface, which frictionally engages the flow to reduce the speed of the air and adhesive pellets.

In one aspect, the adhesive dispensing device also includes a reservoir for receiving the adhesive material from the heater unit and a pump for directing adhesive material from the reservoir. A level sensor may be mounted with an electrically driven electrode along the sidewall of the receiving space. The electrically driven electrode senses a change in dielectric capacitance within the receiving space at a certain level, and this level corresponds to the amount of adhesive material in the receiving space. As a result, the level sensor accurately and rapidly senses when the adhesive material is removed from the receiving space, so that additional adhesive material can be delivered to the receiving space through the cyclonic separator unit when needed to avoid emptying the adhesive dispensing device. In some embodiments, the receiving space is defined by a hopper. The cyclonic separator unit may further include a coupling plate connected to the bottom end of the generally cylindrical pipe. The coupling plate couples to the hopper such that the bottom end of the generally cylindrical pipe is positioned accurately into fluid communication with the receiving space.

In another embodiment according to the invention, a method for supplying adhesive pellets to a receiving space includes delivering a flow of air and adhesive pellets through an inlet hose and into a tangential inlet pipe of a cyclonic separator unit. The flow of air and adhesive pellets is delivered through the tangential inlet pipe and into a generally cylindrical pipe of the cyclonic separator unit. This delivery produces a spiral flow of air and adhesive pellets rotating about an interior surface of the generally cylindrical pipe. The method also includes decelerating the flow of air and adhesive pellets by frictionally contacting the air and adhesive pellets with the interior surface of the generally cylindrical pipe as the air and adhesive pellets rotate in the spiral flow, and depositing the adhesive pellets into the receiving space from the generally cylindrical pipe.

In one aspect, the flow of air and adhesive pellets is decelerated from a first speed to a second non-zero speed that is less than 50% of the first speed. The deceleration using the generally cylindrical pipe is configured to not directly oppose gravitational forces applied to the flow of air and adhesive pellets, and this limits any adhesive build up that may tend to occur on the interior surface. The method further includes receiving a flow of exhaust air from the receiving space into the generally cylindrical pipe. This flow of exhaust air is delivered through the generally cylindrical pipe to an exhaust pipe coupled to the generally cylindrical pipe, thereby exhausting the flow of exhaust air from the cyclonic separator unit. When the exhaust pipe is positioned adjacent to the tangential inlet pipe, the delivery of air and adhesive pellets through the tangential inlet pipe includes directing the flow of air and adhesive pellets into an outer annular space portion partially defined between the exhaust pipe and the interior surface. The spiral flow of air and adhesive pellets is generated by the rotation of the flow within the outer annular space portion.

The outer annular space portion surrounds an inner central space portion such that delivery of the flow of exhaust air through the generally cylindrical pipe includes delivering the flow of exhaust air through the inner central space portion from the receiving space to the exhaust pipe. This flow avoids counter-directional air flow within either of the outer annular space portion and the inner central space portion. The delivery of the flow of exhaust air through the inner central space further includes generating a spiral flow of exhaust air through the inner central space between the receiving space and the exhaust pipe. This spiral flow of exhaust air may be generated by the spiral flow of air and adhesive pellets within the outer annular space portion.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE ILLUSTRATIVE EMBODIMENTS

Figure 1:
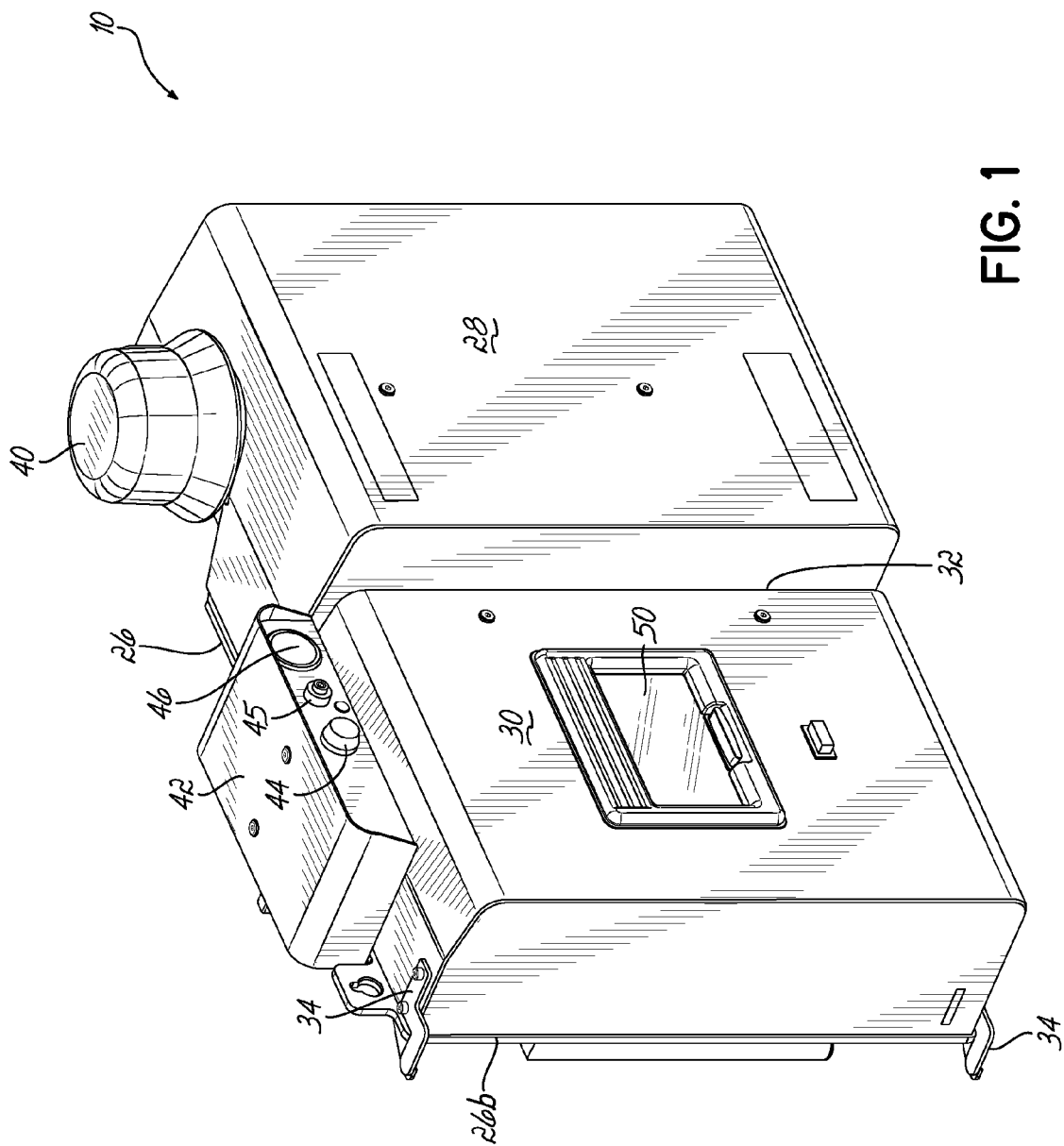
FIG. 1 is a perspective view of an adhesive dispensing device according to one embodiment of the current invention, with a subassembly cover closed.
Figure 2:
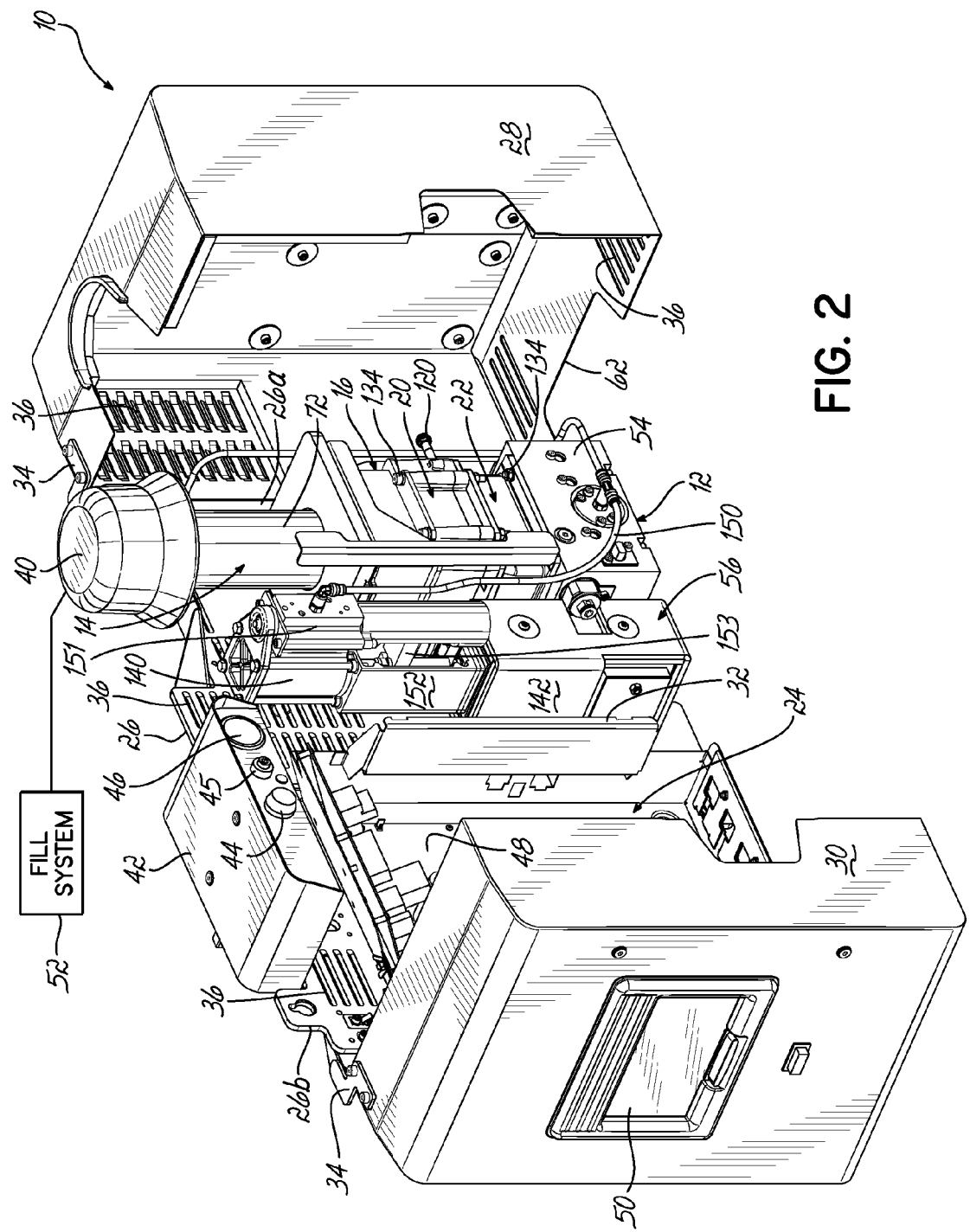
FIG. 2 is a perspective view of the adhesive dispensing device of FIG. 1, with the subassembly cover opened to reveal a melt subassembly.
Figure 3:
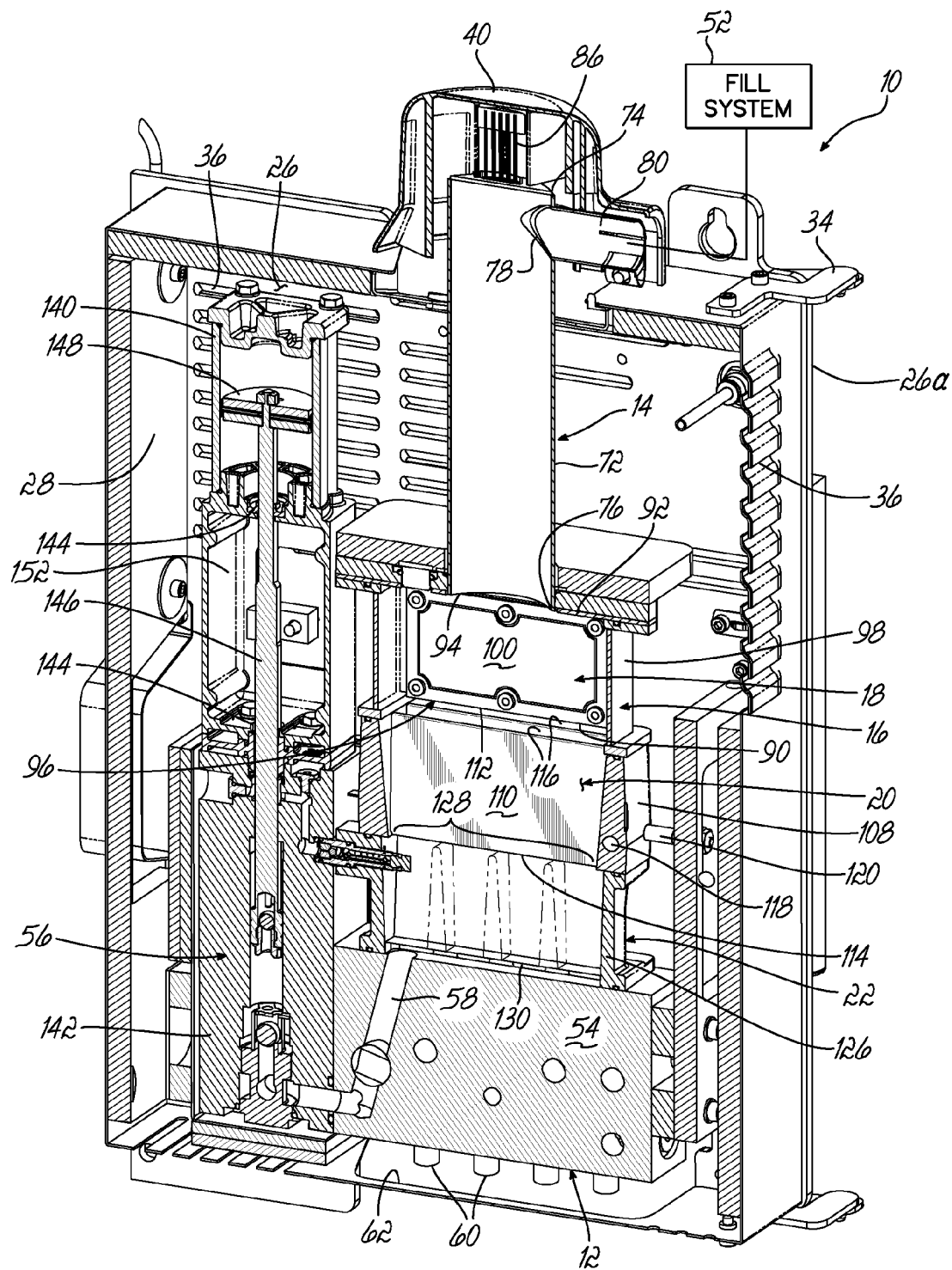
FIG. 3 is a cross-sectional perspective view of at least a portion of adhesive dispensing device of FIG. 2, specifically showing internal features of the melt subassembly.

Referring to FIGS. 1 through 3, an adhesive dispensing device 10 in accordance with one embodiment of the invention is optimized to retain a significantly smaller amount of adhesive material at an elevated application temperature than conventional designs while providing the same maximum flow rate when necessary. More specifically, the adhesive dispensing device 10 includes a melt subassembly 12 that may include a cyclonic separator unit 14, a receiving space 16 with a level sensor 18, a heater unit 20, and a reservoir 22. Each of these elements is described in further detail below. The combination of these elements enables a maximum flow with approximately 80% less retained volume of molten adhesive material held at the elevated application temperature when compared to conventional designs.

The adhesive dispensing device 10 shown in FIGS. 1 through 3 is mounted along a wall surface, as described in U.S. patent application Ser. No. 13/659,291 to Jeter (entitled "Mountable Device For Dispensing Heated Adhesive"), which is co-owned by the assignee of the current application and the disclosure of which is hereby incorporated by reference herein in its entirety. However, it will be understood that the adhesive dispensing device 10 of the invention may be mounted and oriented in any manner without departing from the scope of the invention.

Referring to FIGS. 1 and 2, the adhesive dispensing device 10 includes the melt subassembly 12 and a control subassembly 24, both mounted along a common mounting plate 26. The mounting plate 26 is configured to be coupled to a support wall or structure in a generally vertical orientation as shown. The melt subassembly 12 is mounted adjacent a first terminal end 26a of the mounting plate 26, while the control subassembly 24 is mounted adjacent a second terminal end 26b of the mounting plate 26. In this regard, the melt subassembly 12 is spaced from the control subassembly 24 such that the control subassembly 24 may be isolated from the high operating temperatures (up to 350° F.) of the melt subassembly 12.

The adhesive dispensing device 10 also includes first and second subassembly covers 28, 30 configured to provide selective access to the melt subassembly 12 and to the control subassembly 24, respectively. As shown in the closed position of FIG. 1, the first subassembly cover 28 is coupled to the mounting plate 26 adjacent the first terminal end 26a and is operable to at least partially insulate the melt subassembly 12 from the surrounding environment. The second subassembly cover 30 is coupled to the mounting plate 26 adjacent the second terminal end 26b and is operable to insulate the control subassembly 24 from the melt subassembly 12 and also from the surrounding environment. When the first and second subassembly covers 28, 30 are closed, a thermal gap 32 is formed between the subassembly covers 28, 30 and therefore also between the melt subassembly 12 and the control subassembly 24. This thermal gap 32 further ensures the isolation of the control subassembly 24 from the elevated operating temperatures at the melt subassembly 12.

Each of the first and second subassembly covers 28, 30 is pivotally coupled to the mounting plate 26 at hinge members 34 as shown in FIG. 2. Also shown in FIG. 2, the first subassembly cover 28 includes vents 36 that may be used to avoid overheating of the components of the melt subassembly 12 held within the first subassembly cover 28. However, none of these vents 36 are located towards the thermal gap 32 when the first subassembly cover 28 is closed. The second subassembly cover 30 may also include vents (not shown) facing away from the thermal gap 32 in a similar manner. The mounting plate 26 also includes vents 36 positioned around the melt subassembly 12 and around the control subassembly 24 in the illustrated embodiment. When the first and second subassembly covers 28, 30 are opened as shown in FIG. 2, an operator has access to the components of the melt subassembly 12 and the control subassembly 24 such as when those components need to be repaired. In some embodiments, the melt subassembly 12 may also be pivotally mounted on lift-off hinges (not shown) coupled to the mounting plate 26 so that the melt subassembly 12 can also be pivoted as a unit away from the mounting plate 26 to provide access to the back sides of components of the melt subassembly 12 (for example, to provide access to the connections for the level sensor 18 at the receiving space 16). This pivotal coupling of the melt subassembly 12 may be modified in other embodiments without departing from the scope of the invention.

With continued reference to FIGS. 1 and 2, the first subassembly cover 28 substantially encloses the entire melt assembly 12 in the closed position, except for a top end of the cyclone separator unit 14. This top end (hidden in FIGS. 1 and 2) is covered by a protective cap 40 that insulates the typically metal material forming the cyclone separator unit 14 from an operator who may be working with the adhesive dispensing device 10 when the first subassembly cover 28 is closed. Similarly, the second subassembly cover 30 substantially encloses the entire control subassembly 24 except for an external controller box 42 that may include various elements used for various purposes during operation of the adhesive dispensing device 10. For example, the controller box 42 in the exemplary embodiment includes a siren 44, a screw 45 used to adjust air pressure in a pump described below, and a pressure gage 46 for measuring this air pressure. All other components of the melt subassembly 12 and the control subassembly 24 are isolated from direct contact with an operator during operation of the adhesive dispensing device 10.

The control subassembly 24 is shown in further detail in FIGS. 1 and 2. To this end, the control subassembly 24 includes a controller 48 (e.g., one or more integrated circuits) operatively connected to a control interface 50. The controller 48 is operable to communicate with and control the actuation of components of the melt subassembly 12. For example, the controller may receive signals from the level sensor 18 and cause actuation of more adhesive pellets to be supplied from a fill system 52 (schematically shown in FIGS. 2 and 4) via the cyclonic separator unit 14 when necessary. The control interface 50 is mounted on the second subassembly cover 30 and is operatively connected to the controller 48, such that an operator of the adhesive dispensing device 10 may receive information from the controller 48 or provide input data to the controller 48 at the control interface 50. Although the control interface 50 is illustrated as a display screen in the illustrated embodiment, it will be understood that touch screen displays, keypads, keyboards, and other known input/output devices may be incorporated into the control interface 50. The control subassembly 24 also includes the controller box 42 previously described, and this controller box 42 is operatively connected to the controller 48 to provide additional input/output capabilities between the operator and the controller 48.

The melt subassembly 12 is shown in further detail with reference to FIGS. 2 through 5. As briefly described above, the melt subassembly 12 includes a plurality of components that are configured to receive pellets of adhesive material from the fill system 52, melt and heat those pellets into molten adhesive at an elevated application temperature, and dispense the molten adhesive from outlets to be delivered to downstream guns or modules (not shown). As shown in FIG. 2, the cyclonic separator unit 14 is mounted on top of a hopper 16 defining the receiving space 16 in the exemplary embodiment and is separated from the reservoir 22 by the heater unit 20 and the receiving space 16. Thus, a generally gravity-driven flow of adhesive is caused from the cyclonic separator unit 14 to the heater unit 20 for melting, and then from the heater unit 20 into the reservoir 22. The melt subassembly 12 also includes a manifold 54 located below the reservoir 22 and a pump 56 disposed alongside the other components within the space defined by the mounting plate 26 and the first subassembly cover 28. The manifold 54 includes various conduits 58 extending between the reservoir 22, the pump 56, and one or more outlets 60 located at the bottom of the melt subassembly 12. The pump 56 operates to actuate movement of molten adhesive from the reservoir 22 and through the outlets 60 when required. The outlets 60 may extend through a cutout 62 at the bottom of the first subassembly cover 28 for connection to heated hoses or other conveyance elements for delivering the molten adhesive to downstream guns or modules (not shown), when these downstream items are connected to the adhesive dispensing device 10.

The cyclonic separator unit 14 receives adhesive pellets driven by a pressurized air flow through an inlet hose (not shown). This inlet hose is connected to the source of adhesive pellets (not shown), such as the fill system 52 schematically shown in these Figures. The cyclonic separator unit 14 includes a generally cylindrical pipe 72 including a top end 74 and a bottom end 76 communicating with the receiving space 16. A sidewall opening 78 located in the pipe 72 proximate to the top end 74 is connected to a tangential inlet pipe 80, which is configured to be coupled to the free end of the inlet hose. The top end 74 includes a top opening 82 connected to an exhaust pipe 84 that extends partially into the space within the generally cylindrical pipe 72 adjacent the top end 74. An air filter 86 may be located within the exhaust pipe 84 and above the top end 74 to filter air flow that is exhausted from the cyclonic separator unit 14. Consequently, the cyclonic separator unit 14 receives adhesive pellets driven by a rapidly moving air stream through the tangential inlet pipe 80 and then decelerates the flow of air and pellets as these rotate downwardly in a spiral manner along the wall of the generally cylindrical pipe 72. The pellets and air are deposited within the receiving space 16 and the air returns through the center of the generally cylindrical pipe 72 to be exhausted through the exhaust pipe 84 and the air filter 86. The specific components and operation of the cyclonic separator unit 14 are described in further detail with reference to FIGS. 6 and 9 below.

The receiving space 16 defines a generally rectangular box-shaped enclosure or hopper 16 with an open bottom 90 communicating with the heater unit 20 and a closed top wall 92 having an inlet aperture 94 configured to receive the bottom end 76 of the generally cylindrical pipe 72 of the cyclonic separator unit 14. The receiving space 16 also includes the level sensor 18, which is a capacitive level sensor in the form of a plate element 96 mounted along one of the peripheral sidewalls 98 of the receiving space 16. The plate element 96 includes one driven electrode 100, and a portion of the sidewall 98 or another sidewall 98 of the receiving space 16 acts as a second (ground) electrode of the level sensor 18. For example, the plate element 96 may also include a ground electrode in some embodiments. The level sensor 18 determines the amount or level of adhesive material in the receiving space 16 by detecting with the plate element 96 where the dielectric capacitance level changes between the driven electrode 100 and ground (e.g., open space or air in the receiving space 16 provides a different dielectric capacitance than the adhesive material in the receiving space 16). Although the term "hopper" is used in places during the description of embodiments of the adhesive dispensing device 10, it will be understood that alternative structures/receiving spaces may be provided for feeding the solid adhesive from the fill system 52 into the heater unit 20.

The plate element 96 may be mounted along substantially an entire sidewall 98 at least partially defining the receiving space 16 in order to provide more rapid heat conduction to the plate element 96 for melting off build up of pellets or adhesive material, when necessary. For example, the plate element 96 may be mounted along a sidewall defining the receiving space 16 such that the level sensor 18 defines a ratio of the surface area of the driven electrode 100 to the surface area of the sidewall 98 defining the receiving space 16 of about 0.7 to 1. In this regard, the surface area of the driven electrode 100 is about 70% of the surface area of the sidewall 98. Moreover, the large surface area sensed by the plate element 96 provides more accurate and dependable level sensing, which enables more accurate and timely delivery of adhesive material to the melt subassembly 12 when needed. To this end, the broader sensing window provided by the large size of the driven electrode 100 relative to the size of the receiving space 16 also enables more precise control by sensing various states of fill within the receiving space 16, which causes different control actions to be taken depending on the current state of fill within the receiving space 16. The broader sensing window is also more responsive to changes in fill level, which can rapidly change during periods of high output from the adhesive dispensing device 10. Therefore, one or more desired amounts of adhesive material in the receiving space 16 (for example, 30% to 60% filled) may be maintained during operation of the adhesive dispensing device 10. Thus, it is advantageous to make a broader sensing window by maximizing the surface area of the driven electrode 100 relative to the surface area of the sidewall 98 defining the receiving space 16.

The heater unit 20 is positioned adjacent to and below the receiving space 16 such that the heater unit 20 receives adhesive material flowing downwardly through the open bottom 90 of the receiving space 16. The heater unit 20 includes a peripheral wall 108 and a plurality of partitions 110 extending across the space defined by the peripheral wall 108 between the receiving space 16 and the reservoir 22. As most clearly illustrated in FIGS. 3 and 5, each of the partitions 110 defines a generally triangular cross-section that narrows towards an upstream end 112 facing the open bottom 90 of the receiving space 16 and broadens towards a downstream end 114 facing the reservoir 22. The partitions 110 divide the space between the receiving space 16 and the reservoir 22 into a plurality of smaller openings 116 configured to enable flow of the adhesive material to the reservoir 22. The openings 116 are small enough adjacent the downstream ends 114 of the partitions 110 to force most of the adhesive material into contact with one of the partitions 110. The partitions 110 are cast with the peripheral wall 108 from aluminum in the exemplary embodiment, although it will be appreciated that different heat conductive materials and different manufacturing or machining methods may be used to form the heater unit 20 in other embodiments.

In this regard, the heater unit 20 of the exemplary embodiment is in the form of a heater grid 20. It will be understood that the plurality of openings 116 may be defined by different structure than grid-like partitions in other embodiments of the heater unit 20, including, but not limited to, fin-like structures extending from the peripheral wall 108, without departing from the scope of the invention. In this regard, the "heater unit" 20 may even include a non grid-like structure for heating the adhesive in other embodiments of the invention, as the only necessary requirement is that the heater unit 20 provide one or more openings 116 for flow of adhesive through the adhesive dispensing device 10. In one alternative, the partitions 110 could be replaced by fins extending inwardly from the peripheral wall 108, as is typically the case in larger sized heater units used in larger melters. It will be understood that the heater unit 20 may be separately formed and coupled to the hopper 16 defining the receiving space 16 or may be integrally formed as a single component with the hopper 16 defining the receiving space 16 in embodiments consistent with the invention.

Figure 5:
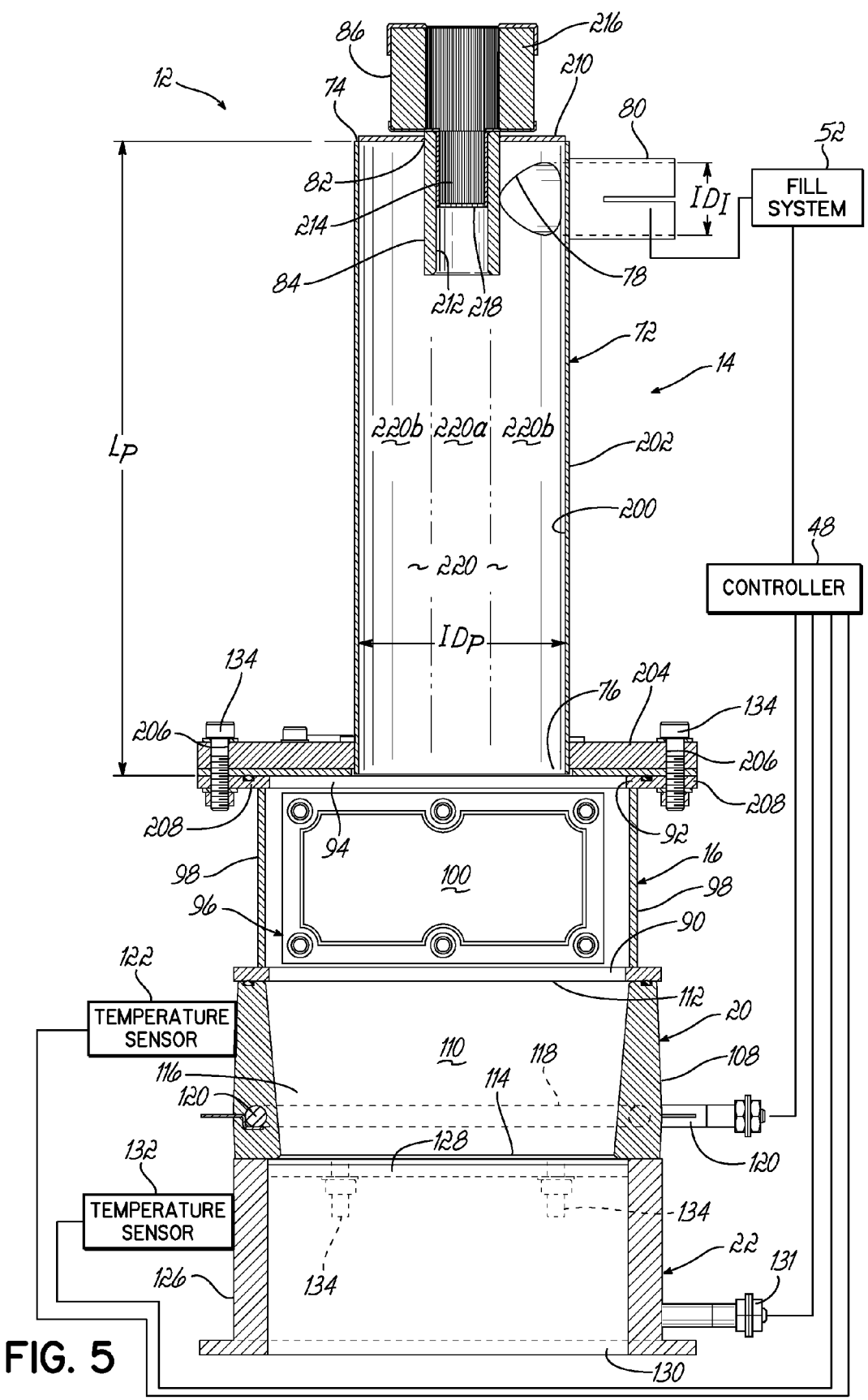
FIG. 5 is a cross-sectional front view of the melt subassembly of FIG. 4.

The heater unit 20 is designed to optimize the heating and melting of adhesive material flowing through the adhesive dispensing device 10. To this end, the peripheral wall 108 includes a hollow passage 118 as shown in FIGS. 3 and 5 and configured to receive a heating element 120 such as a resistance heater, a tubular heater, a heating cartridge, or another equivalent heating element, which may be inserted or cast into the heater unit 20. The heating element 120 receives signals from the controller 48 and applies heat energy to the heater unit 20, which is conducted through the peripheral wall 108 and the partitions 110 to transfer heat energy to the adhesive material along the entire surface area defined by the heater unit 20. For example, the exemplary embodiment of the heater unit 20 includes a temperature sensor 122 to detect the temperature of the heater unit 20. The temperature sensor 122 is positioned to sense the temperature at the peripheral wall 108 and may indirectly sense the adhesive temperature as well, although it will be understood that the adhesive temperature tends to lag behind the temperature changes of the heater unit 20 by a small margin. In other non-illustrated embodiments, the temperature sensor 122 may include different types of sensors, such as a probe extending into the adhesive. To this end, the temperature sensor 122 provides regular feedback on a unit temperature for use in controlling the heating element 120. The heat energy is also conducted through the reservoir 22 and the receiving space 16, which helps maintain the temperature of the molten adhesive in the reservoir 22 and helps melt off any adhesive material inadvertently stuck in the receiving space 16 (such as on the plate element 96 of the level sensor 18). The design of the heater unit 20 and the partitions 110 also improves the start up process following a shut down or standby of the adhesive dispensing device 10 by more rapidly providing heat energy to the adhesive material in the receiving space 16 and in the reservoir 22 (which may be solidified during shut down) as well as the adhesive material in the heater unit 20. In the exemplary embodiment, the heater unit 20 is operable to bring the entire melt subassembly 12 up to operating temperature from a standby state with in a warm up time of about 7 minutes, thereby substantially reducing delays caused by lengthy warm up cycles.

The reservoir 22 is positioned adjacent to and below the heater unit 20 such that the reservoir 22 receives adhesive material flowing downwardly through the openings 116 defined in the heater unit 20. The reservoir 22 includes a peripheral wall 126 extending between an open top end 128 and an open bottom end 130. The reservoir 22 may optionally include partitions or fins projecting inwardly from the peripheral wall 126 in some embodiments (shown in phantom in the Figures). The open top end 128 communicates with the heater unit 20 adjacent to the downstream ends 114 of the partitions 110. The open bottom end 130 is bounded by the manifold 54 and thereby provides communication of molten adhesive material into the conduits 58 of the manifold 54. Similar to the heater unit 20, the reservoir 22 may also be manufactured from aluminum such that heat from the heater unit 20 is conducted along the peripheral wall 126 for maintaining the temperature of the molten adhesive in the reservoir 22. In addition, a reservoir heating device in the form of a heating element 131 may be provided in the peripheral wall 126 to further heat or maintain the melted adhesive in the reservoir 22 at the elevated application temperature. To this end, the heating element 131 may include a resistance heater, a tubular heater, a heating cartridge, or another equivalent heating element, which may be inserted or cast into the reservoir 22. However, other heat conductive materials and other manufacturing methods may be used in other embodiments consistent with the scope of the invention. It will be understood that the heater unit 20 may be separately formed and coupled to the reservoir 22 or may be integrally formed as a single component with the reservoir 22 in embodiments consistent with the invention.

Figure 4:
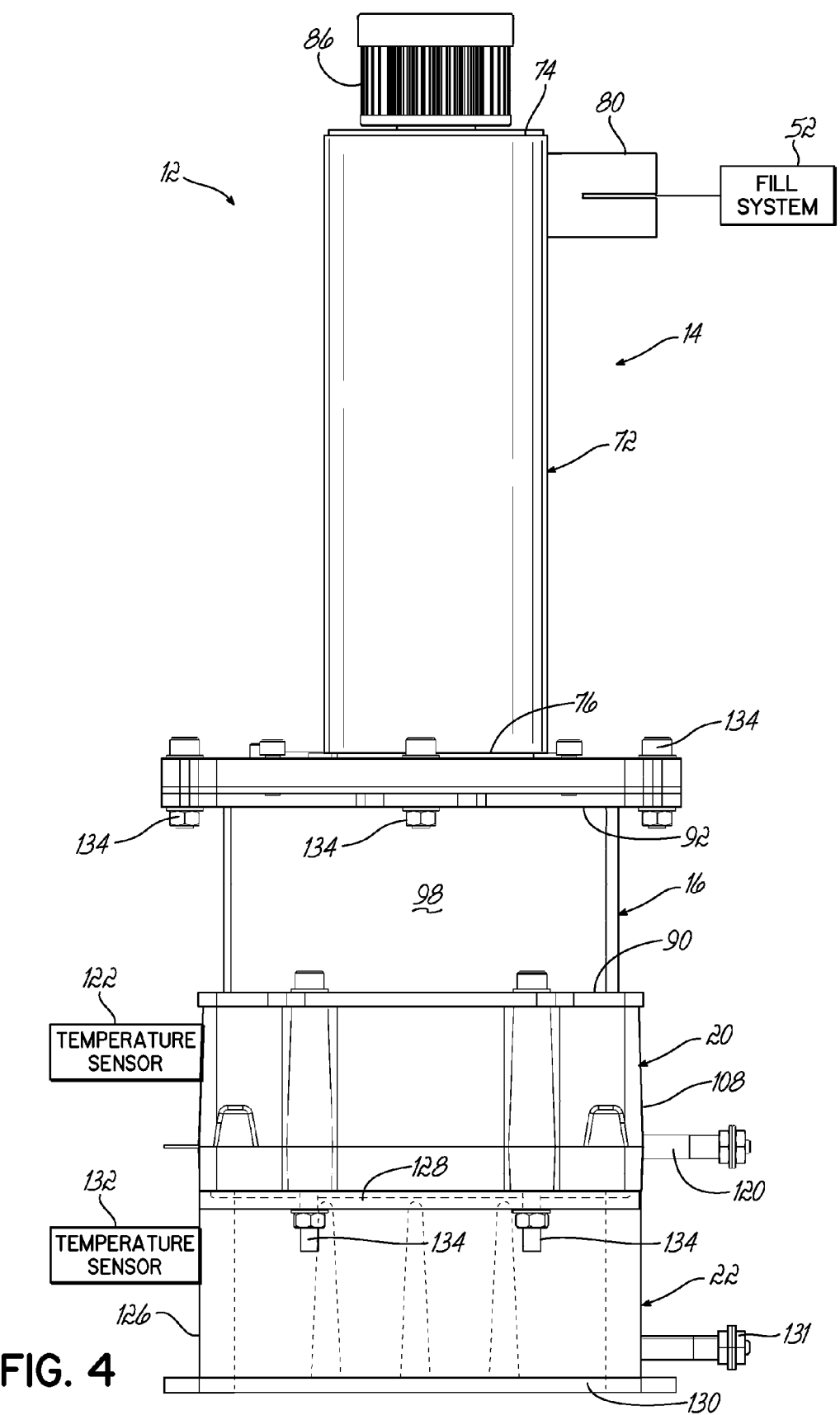
FIG. 4 is a front view of the melt subassembly of FIG. 3.

The reservoir 22 may include one or more sensors configured to provide operational data to the controller 48 such as the temperature of the adhesive material in the reservoir 22. For example, the exemplary embodiment of the reservoir 22 includes a temperature sensor 132 to detect the temperature of the reservoir 22. The temperature sensor 132 is positioned to sense the temperature at the peripheral wall 126 and may indirectly sense the adhesive temperature as well, although it will be understood that the adhesive temperature tends to lag behind the temperature changes of the reservoir 22 by a small margin. In other non-illustrated embodiments, the temperature sensor 132 may include different types of sensors, such as a probe extending into the adhesive. This detected temperature may be communicated to the controller 48 and used to control the heat energy output by the heating element 131 in the reservoir, or also the heat energy output by the heating element 120 of the heater unit 20. It will be understood that a plurality of additional sensors may be located within the various elements of the melt subassembly 12 for communication with the controller 48 to monitor the accurate operation of the adhesive dispensing device 10. However, a generally expensive level sensor for use below the heater unit 20 is not necessary in the exemplary embodiment in view of the highly accurate measurements of adhesive level in the receiving space 16 that are enabled by the capacitive level sensor 18. As shown in FIG. 4, the reservoir 22, heater unit 20, receiving space 16, and cyclonic separator unit 14 are coupled together with a plurality of threaded fasteners 134 connecting the peripheries of these elements. However, it will be understood that alternative fasteners or methods of coupling (or integral forming of) these elements together may be used in other embodiments.

As briefly described above, the manifold 54 is located adjacent to and below the open bottom end 130 of the reservoir 22 so as to provide fluid communication from the reservoir 22 to the pump 56 and then to the outlets 60. To this end, the manifold 54 is machined from an aluminum block to include a plurality of conduits 58 (one of which is shown in FIG. 3) extending between these various elements of the melt subassembly 12. It will be understood that the manifold 54 may further include additional elements (not shown) in some embodiments, such as valves for controlling the flow of adhesive material to and from the pump 56 and supplemental heating elements for maintaining the temperature of the molten adhesive in the conduits 58. It will be understood that all or a portion of the manifold 54 may be separately formed and coupled to the reservoir 22 or may be integrally formed as a single component with the reservoir 22 in embodiments consistent with the invention.

The pump 56 is a known double-acting pneumatic piston pump that is positioned adjacent to and alongside the previously described elements of the melt subassembly 12. More specifically, the pump 56 includes a pneumatic chamber 140, a fluid chamber 142, and one or more seals 144 of seal cartridges disposed between the pneumatic chamber 140 and the fluid chamber 142. A pump rod 146 extends from the fluid chamber 142 to a piston 148 located within the pneumatic chamber 140. Pressurized air is delivered in alternating fashion to the upper and lower sides of the piston 148 to thereby move the pump rod 146 within the fluid chamber 142, causing drawing of molten adhesive into the fluid chamber 142 from the reservoir 22 and expelling of the molten adhesive in the fluid chamber 142 to the outlets 60. The pressurized air may be delivered through an air inlet hose 150 and controlled by a spool valve 151 (only the outer housing of which is shown) shown most clearly in FIG. 2. The fluid chamber 142 may also include a check valve leading back to the reservoir 22 to deliver any adhesive that would otherwise leak from the fluid chamber 142 back into the reservoir 22. The pump 56 may be controlled by the controller 48 to deliver the desired flow rate of adhesive material through the outlets 60 as well understood in the dispenser field. More particularly, the pump 56 may include a control section 152 containing a shifter 153 (partially shown in FIG. 2) used to mechanically actuate changes in directional movement for the piston 148 and the pump rod 146 near the end limit positions of these elements.

In operation, the heater unit 20 is brought up to temperature by the heating element 120 and heat energy is conducted into the receiving space 16 and the reservoir 22 to bring those elements and the adhesive material contained within up to the desired elevated application temperature. The reservoir 22 may also be brought up to temperature by the heating element 131 located at the reservoir 22, as discussed above. The controller 48 will receive a signal from the temperature sensor 132 when the elevated application temperature has been reached, which indicates that the melt subassembly 12 is ready to deliver molten adhesive. The pump 56 then operates to remove molten adhesive material from the open bottom end 130 of the reservoir 22 as required by the downstream guns or modules (not shown) connected to the outlets 60. As the pump 56 removes adhesive material, gravity causes at least a portion of the remaining adhesive material to move downwardly into the reservoir 22 from the receiving space 16 and the openings 116 in the heater unit 20. The lowering of the level of adhesive pellets 160 (or melted adhesive material) within the receiving space 16 is sensed by the level sensor 18, and a signal is sent to the controller 48 indicating that more adhesive pellets 160 should be delivered to the melt subassembly 12. The controller 48 then sends a signal that actuates delivery of adhesive pellets 160 from the fill system 52 through the cyclonic separator unit 14 and into the receiving space 16 to refill the adhesive dispensing device 10. This process continues as long as the adhesive dispensing device 10 is in active operation. The specific components and operation of the adhesive dispensing device 10 of this embodiment are described in further detail in co-pending U.S. patent application Ser. No. 13/799,622 to Clark et al., entitled "Adhesive Dispensing Device Having Optimized Reservoir and Capacitive Level Sensor", the disclosure of which is hereby incorporated by reference herein in its entirety.

Advantageously, the melt subassembly 12 of the adhesive dispensing device 10 has been optimized to hold a reduced amount of adhesive material at the elevated application temperature compared to conventional dispensing devices. To this end, a combination of optimized features in the melt subassembly 12 enables the same maximum adhesive throughput as conventional designs with up to 80% less adhesive material being retained within the melt subassembly 12. This combination of features includes the improved reliability of the adhesive filling system (e.g., the cyclonic separator unit 14 and the receiving space 16) enabled by the capacitive level sensor 18 and the smaller sized receiving space 16; the design of the heater unit 20 including the partitions 110; the design of the smaller sized reservoir 22; and smart melt technology run by the controller 48 to refill the melt subassembly 12 with adhesive material as rapidly as needed. With these features in combination, the total retained volume of adhesive material (both molten adhesive and adhesive pellets 160) held within the melt subassembly 12 is approximately 2 liters, which is significantly less than conventional dispensing devices and melters which require about 10 liters of adhesive material to be held at the elevated application temperature. Consequently, significantly less adhesive material is held at the elevated application temperature, thereby reducing the likelihood that adhesive material will remain in the melt subassembly 12 long enough to become degraded or charred by staying at the high temperature over a long period of time. In addition, the smaller volume of retained adhesive material enables the melt subassembly 12 to be brought to the elevated application temperature during a warm up cycle much quicker than conventional designs which need to heat significantly more adhesive material during warm up.

Figure 6:
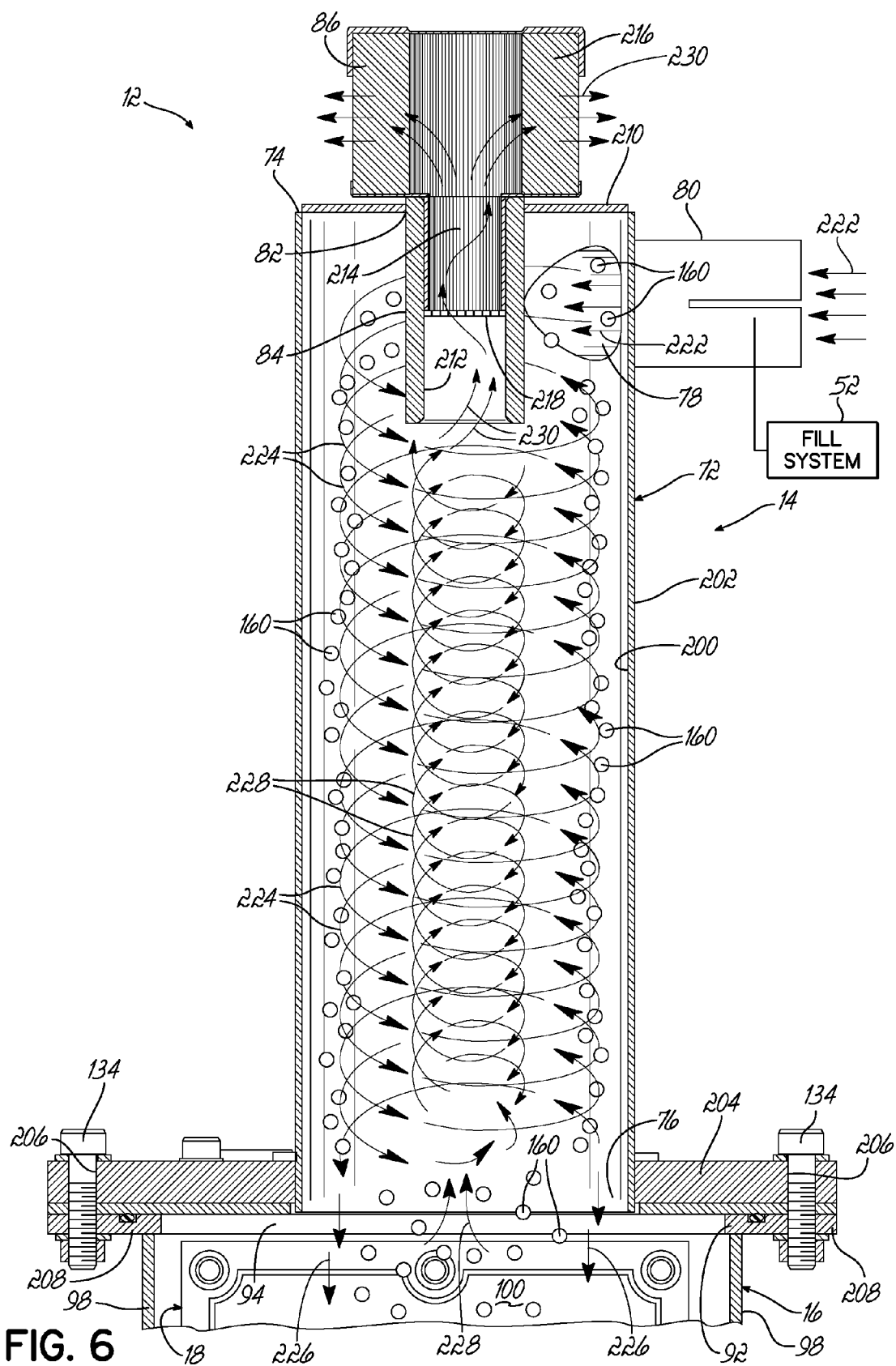
FIG. 6 is a detailed cross-sectional front view of the cyclonic separator unit of FIG. 5, schematically illustrating incoming and outgoing air and pellet flows.

With reference to FIGS. 5 and 6, the cyclonic separator unit 14 of the exemplary embodiment is shown in further detail. As described above, the cyclonic separator unit includes a generally cylindrical pipe 72 extending from a top end 74 to a bottom end 76. The generally cylindrical pipe 72 is manufactured from steel in this embodiment, although it will be understood that other metal materials may be used to make the generally cylindrical pipe 72 without departing from the scope of the invention. The steel material of the pipe 72 is coated with polytetrafluoroethylene (PTFE, also known as Teflon®) along at least an interior surface 200 to significantly reduce the likelihood of adhesive material sticking to the pipe 72 between the sidewall opening 78 and the bottom end 76. The coated interior surface 200 extends between the sidewall opening 78 and the bottom end 76 so as to encourage a low-friction engagement of air flow with adhesive pellets 160 and the pipe 72 to gently reduce the velocity of the air flow and the adhesive pellets 160 prior to deposit in the receiving space 16.

The generally cylindrical pipe 72 also includes an exterior surface 202 facing outwardly between the top end 74 and the bottom end 76. Adjacent the bottom end 76, a coupling plate 204 is welded or otherwise attached to the exterior surface 202 of the pipe 72. The coupling plate 204 is sized to be aligned with the closed top wall 92 of the hopper 16 defining the receiving space 16 when the open bottom end 76 is inserted into the inlet aperture 94 of the hopper 16 defining the receiving space 16. To this end, the coupling plate 204 includes fastener apertures 206 configured to receive the threaded fasteners 134 that hold the cyclonic separator unit 14 to the hopper 16. More specifically, the peripheral sidewall 98 of the hopper 16 defining the receiving space 16 may include connection flanges 208 projecting away from the top wall 92 and configured to receive the threaded fasteners 134. As a result, the open bottom end 76 of the generally cylindrical pipe 72 is fixed in position in communication with the inlet aperture 94 and the receiving space 16.

The top end 74 of the generally cylindrical pipe 72 is closed off by an end wall 210 that includes the top opening 82 previously described. The top opening 82 is centered on the end wall 210 such that the top opening 82 and the end wall 210 are concentric. The exhaust pipe 84 is a smaller diameter pipe than the generally cylindrical pipe 72 and is inserted through the end wall 210 at the top opening 82. The exhaust pipe 84 and the end wall 210 may each be welded into position in the exemplary embodiment; however, it will be understood that other methods of coupling the exhaust pipe 84 and/or the end wall 210 to the generally cylindrical pipe 72 may be used in other embodiments. For example, the exhaust pipe 84 could be an injection molded piece integrally or separately formed with the end wall 210 and then twist-fitted or snapped into engagement with the generally cylindrical pipe 72. In another alternative, the exhaust pipe 84 and end wall 210 could be formed in a separate cyclone cap that is configured to be engaged with the generally cylindrical pipe 72 as described in the alternative embodiment with reference to FIGS. 8 and 9 below.

The exhaust pipe 84 defines an internal passage 212 sized to receive a lower projecting portion 214 of the air filter 86 used with the exemplary embodiment of the adhesive dispensing device 10. In this regard, the air filter 86 is coupled to the generally cylindrical pipe 72 by inserting the lower projecting portion 214 into the exhaust pipe 84 until an upper primary portion 216 of the air filter 86 sits on the end wall 210 as shown in FIG. 6. In some embodiments, the internal passage 212 of the exhaust pipe 84 may further include an optional metal screen 218 having large perforations or flow passages (not shown) and inserted into the internal passage 212 immediately below the lower projecting portion 214 of the air filter 86. Alternatively, the internal passage 212 of the exhaust pipe 84 may include no screens or internal structures below the air filter 86. In addition, it will be understood that the exhaust pipe 84 may be reconfigured with a bent profile outside the generally cylindrical pipe 72 in other embodiments so that the air filter 86 and the exhaust path do not point upwardly and thereby further increase the length of the melt subassembly 12.

The generally cylindrical pipe 72 encloses an interior cylindrical space 220 that includes an inner central space portion 220a and an outer annular space portion 220b adjacent the interior surface 200. Near the top end 74 of the pipe 72, the exhaust pipe 84 fills the inner central space portion 220a such that only the outer annular space portion 220b is available to receive flow of air and adhesive pellets 160. This outer annular space portion 220b is fluidically coupled with the previously described tangential inlet pipe 80 by a sidewall opening 78 proximate to the top end 74 of the generally cylindrical pipe 72. The tangential inlet pipe 80 may be welded into connection with the generally cylindrical pipe 72 so as to be oriented nearly tangential to the generally cylindrical pipe 72. As a result, pressurized air and adhesive pellets 160 flowing through the tangential inlet pipe 80 enter the pipe 72 through the sidewall opening 78 in such a manner as to encourage rotating spiral flow downwardly along the interior surface 200 and within the outer annular space portion 220b. In other words, the sidewall opening 78 is not oriented so as to direct the air and adhesive pellets 160 to flow directly into the exhaust pipe 84 and the inner central space portion 220a. Similar to the exhaust pipe 84, the tangential inlet pipe 80 may be coupled to the generally cylindrical pipe 72 by other non-welding methods in other embodiments of the invention. For example, the tangential inlet pipe 80 could be an injection molded piece twist-fitted or snapped into engagement with the generally cylindrical pipe 72, or formed as part of a separate removable cyclone cap in other embodiments. In such embodiments, a quick connect feature (not shown) could also be molded into the tangential inlet pipe 80 to enable easy and rapid connections with the inlet hose leading to the source of adhesive pellets 160 at the fill system 52.

The generally cylindrical pipe 72 of the exemplary embodiment defines a substantially constant inner diameter $ID_P$ of about 3.0 inches. It will be understood that the inner diameter $ID_P$ may be modified to be larger in other embodiments without departing from the scope of the invention. In the exemplary embodiment shown in FIGS. 5 and 6, the generally cylindrical pipe 72 is not significantly tapered along the length between the top end 74 and the bottom end 76. As a result, the interior surface 200 of the pipe 72 does not directly oppose any gravity forces applied to the adhesive pellets 160 as the adhesive pellets 160 and air flow through the pipe 72. By contrast, conventional tapered cyclonic separator designs typically include a significant taper in which the inner diameter at the inlet end is larger than the inner diameter at the outlet end by a factor of 2 or more (e.g., the inner diameter $ID_P$ at the inlet end is at least twice as large as the inner diameter $ID_P$ at the outlet end). It will be understood that the generally cylindrical pipe 72 may alternatively be produced with a slight taper in other embodiments. This slight taper may be defined by the inner diameter at the top end 74 being larger than the inner diameter at the bottom end 76 by a factor ranging from about 1.0 to about 1.5. For example, the inner diameter at the top end 74 would be no larger than 150% the size of the inner diameter at the bottom end 76 (and no smaller than 100% the size of the inner diameter at the bottom end 76). Therefore, even in these alternative embodiments, the pipe 72 does not directly oppose any gravity forces applied to the adhesive pellets 160, which would increase the frictional engagement between the interior surface 200 and the adhesive pellets 160.

In operation, the cyclonic separator unit 14 receives flows of adhesive pellets 160 and air as shown in further detail in FIG. 6. The cyclonic separator unit 14 is optimized for the size and shape of adhesive pellets 160 used with the adhesive dispensing device 10, which are 3 to 5 millimeter diameter round-shaped adhesive pellets 160. This size and shape of adhesive pellets 160 enables reliable movement of the adhesive material in small controllable doses through the inlet hose (having a diameter of 0.75 inches) and through the tangential inlet pipe 80 (having a diameter $ID_I$ of 1.25 inches) into the generally cylindrical pipe 72. In this embodiment, the inlet hose (not shown) is secured to the tangential inlet pipe 80 by using a slide-in and clamp type connection such as with a band clamp. It will be understood that the diameters of the inlet hose and the tangential inlet pipe 80 may be modified in other embodiments to accommodate larger pellets 160 if necessary, and the method of coupling these elements may also be modified in other embodiments. The air velocity of the air flow moving the adhesive pellets 160 is approximately 3500 feet per minute at the tangential inlet pipe 80, and the corresponding speed of the adhesive pellets 160 is approximately 2400 feet per minute at the tangential inlet pipe 80. If air and adhesive were supplied directly into the receiving space 16 at these velocities from the inlet hose, splashing could occur that could lead to build up and blockages of inlets or outlets to and from the receiving space 16 and additional interference to proper operation of the level sensor 18. Thus, the cyclonic separator unit 14 is optimized by selecting a length $L_P$ of the pipe 72 that will enable sufficient reduction of air velocity and adhesive speed to avoid significant splashing in the receiving space 16, but not so much velocity and speed reduction as to completely stop air flow within the pipe 72. In the exemplary embodiment, for example, the length $L_P$ is sufficient to reduce the air velocity and adhesive speed by about 50% (e.g., reduce the speed of the adhesive pellets 160 to about 1200 feet per minute). It will be appreciated that the length $L_P$ may be modified to adjust the amount of speed and velocity reduction achieved by the cyclonic separator unit 14, and also to fit within the allowed space within the first subassembly cover 28 for the cyclonic separator unit 14 in other embodiments.

As discussed above, the inlet hose has a diameter of 0.75 inches in the exemplary embodiment because that diameter of hose is sufficient in size to carry the air flow required to move adhesive pellets 160 of the 3 to 5 millimeter round size and shape. The exhaust pipe 84 is generally sized at the same diameter as the inlet hose, and therefore defines a diameter of 0.75 inches in the exemplary embodiment. A minimum diameter for the inner diameter $ID_P$ of the pipe 72 is approximately set by adding the size of the exhaust pipe 84 and two times the inner diameter $ID_I$ of the tangential inlet pipe 80 (which is about 1.25 inches in the exemplary embodiment). Thus, the inner diameter $ID_P$ of the pipe 72 is chosen to be 3.0 inches, which is nearly equal to this minimum diameter. This minimum diameter of the pipe 72 enables both an exhaust pipe 84 to be of sufficient size for air flow removal as well as the directing of an inlet flow of adhesive pellets 160 along the pipe sidewall interior surface 200 rather than directly into the exhaust pipe 84. As noted above, these diameter dimensions would be increased if larger or differently-shaped pellets were used with the cyclonic separator unit 14. In one such example, the diameter of the inlet hose and the exhaust pipe 84 may be increased to 1.25 inches to accommodate up to 12 millimeter adhesive pellets 160 of varying shapes, and the inner diameter $ID_P$ of the pipe 72 would be increased to 3.25 inches or 3.5 inches in accordance with the increase in size in the exhaust pipe 84.

The reduction of velocity and speed results from the frictional flow of the air and the adhesive pellets 160 against the interior surface 200 as the air and adhesive pellets 160 move through the generally cylindrical pipe 72. In this regard, the air and adhesive pellets 160 enter the generally cylindrical pipe 72 through the tangential inlet pipe 80 and through the sidewall opening 78 with a tangential flow as indicated by arrows 222 in FIG. 6. Gravity and this tangential flow then collectively cause the air and adhesive pellets 160 to spiral downwardly in the outer annular space portion 220b between the sidewall opening 78 and the bottom end 76 as shown by arrows 224. This spiraling flow causes the interior surface 200 to frictionally engage the air and the adhesive pellets 160 to thereby slow the flow of air and adhesive pellets 160. At the bottom end 76 of the generally cylindrical pipe 72, the slower moving air and adhesive pellets 160 are released into the receiving space 16 as shown by arrows 226. The slower moving air and adhesive pellets 160 do not tend to cause significant splashing of molten adhesive material within the receiving space 16.

The adhesive pellets 160 are collected in a stack or pile within the receiving space 16, but the air flow must be exhausted from the receiving space 16. Consequently, the air flow returns from the receiving space 16 into the inner central space portion 220a of the generally cylindrical pipe 72 as shown by arrows 228. As a result of the spiraling downward flow of air and adhesive pellets 160 in the outer annular space portion 220b, the return air flow may also swirl as it moves upwardly within the inner central space portion 220a (this swirling movement is shown by arrows 228). The return air flow then enters the exhaust pipe 84 adjacent the top end 74 and flows through the air filter 86 as shown by arrows 230. The filtered air flows through or around the protective cap 40 that covers the top end 74 and the air filter 86, and then flows out of the melt subassembly 12.

Accordingly, the cyclonic separator unit 14 advantageously provides sufficient frictional engagement with the air and adhesive pellets 160 to slow these flows and thereby avoid significant splashing of molten adhesive within the receiving space 16 that could lead to build up and blockages of the inlet aperture 94. However, the air flow is not completely stopped and separated from the adhesive pellets 160 within the cyclonic separator unit 14, which would likely cause a higher frictional engagement with the adhesive pellets 160 that could cause melting and adhesive build up along the interior surface 200. To this end, the continued air flow along the entire length $L_P$ of the pipe 72 moves or "washes" the adhesive pellets 160 from sticking against the interior surface 200. Furthermore, the lack of significant tapering in the pipe 72 avoids higher frictional engagement between adhesive pellets 160 and the interior surface 200 that would be caused by directly opposing the gravity force acting on the adhesive pellets 160. When used with the optimized adhesive pellets 160 and the remainder of the melt subassembly 12, the cyclonic separator unit 14 and receiving space 16 provide a highly accurate and quickly responsive material fill system for maintaining the desired amounts of adhesive material within the melt subassembly 12 during periods of low flow and during periods of high flow.

Figure 7:
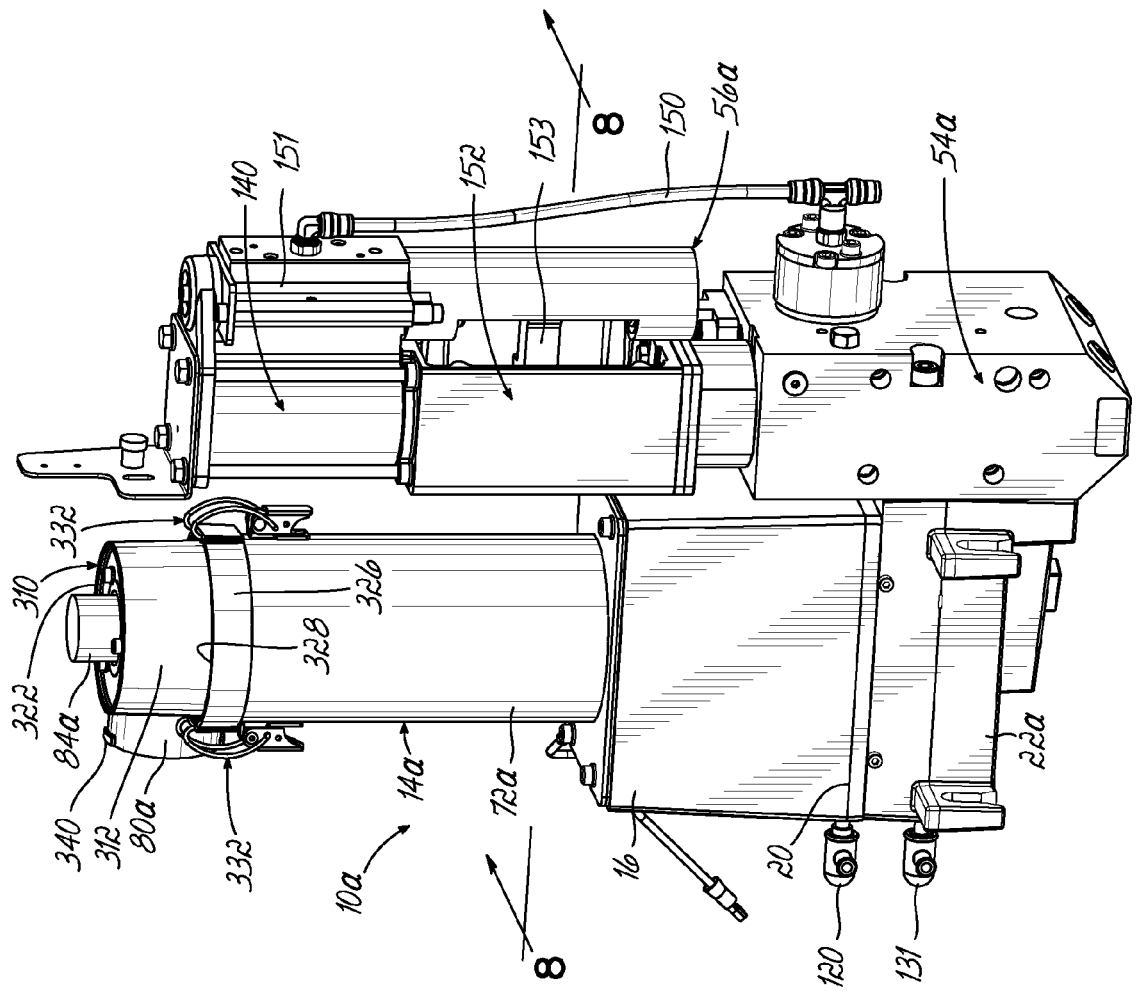
FIG. 7 is a perspective view of an alternative embodiment of the adhesive dispensing device, including a similar melt subassembly as the embodiment of FIGS. 1 through 6.
Figure 8:
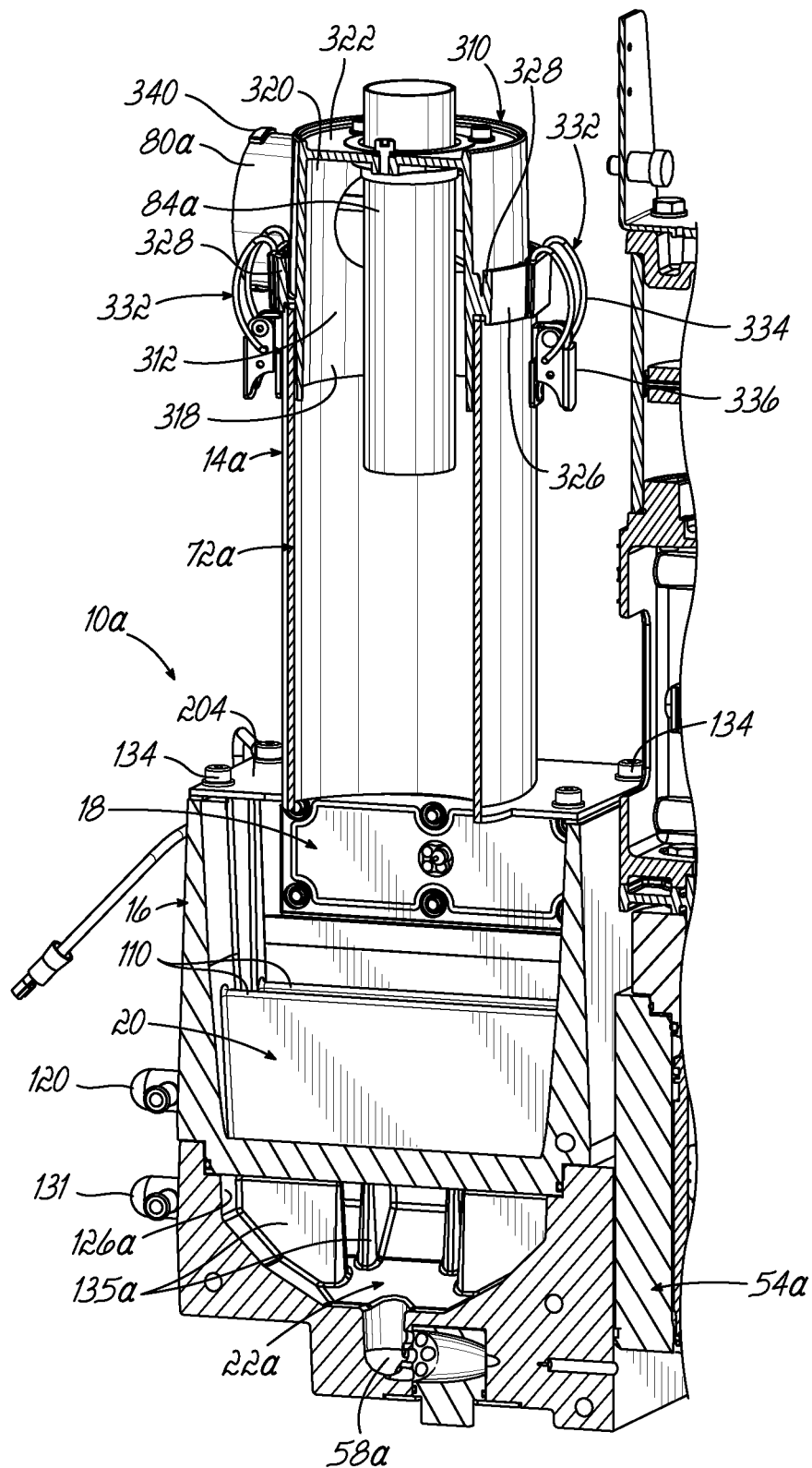
FIG. 8 is a cross-sectional perspective view of a portion of the adhesive dispensing device of FIG. 7 taken along line 8-8.
Figure 9:
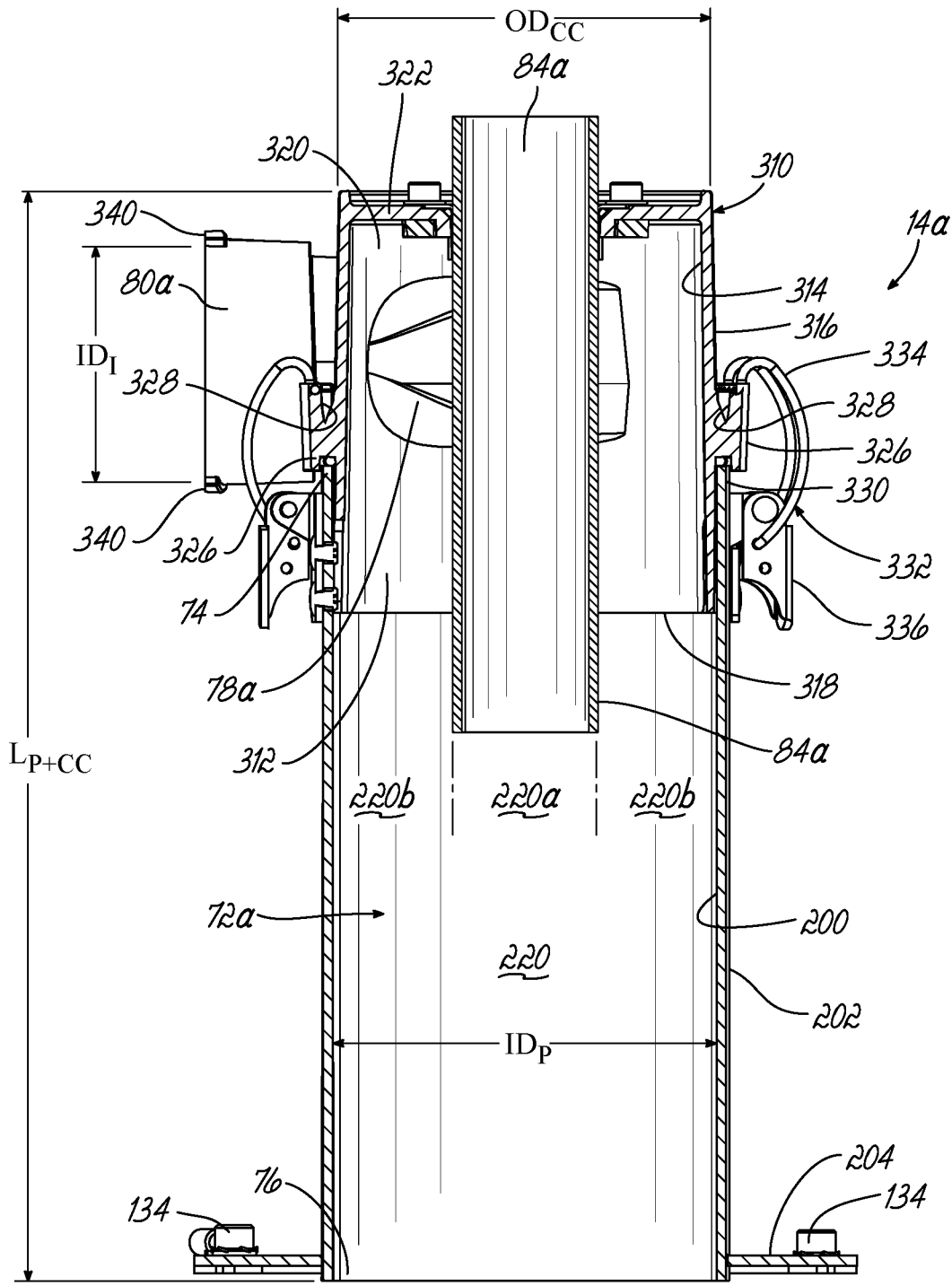
FIG. 9 is a cross-sectional front view of the cyclonic separator unit of FIG. 8 taken along the longitudinal center of the cyclonic separator unit.

With reference to FIGS. 7 through 9, another exemplary embodiment of the adhesive dispensing device 10a and the cyclonic separator unit 14a is shown in detail. This embodiment of the adhesive dispensing device 10a includes many of the same elements as the previously-described embodiment of FIGS. 1 through 6, and these elements are shown with identical reference numbers without further description below when the elements are unchanged from the previous embodiment. Modified elements including the adhesive dispensing device 10a itself are provided with similar reference numbers followed by an "a" to highlight the modified components, except at the cyclonic separator unit 14a, where some of the new and modified elements have been labeled with reference numbers above 300. These modified and additional components are described in detail below.

Beginning with reference to the right-hand side of FIG. 7, the pump 56a is slightly modified from what was shown in the wall-mounted context of the embodiment of FIG. 1. To this end, the pump 56a includes a combined fluid chamber and manifold 54a in addition to the pneumatic chamber 140 and the control section 152. To this end, the combined fluid chamber and manifold 54a replace the separate fluid chamber 124 and manifold 54 of the previous embodiment, thereby simplifying the total amount of structure that must be provided in the adhesive dispensing device 10a. As noted above, the shifter 153 may be a mechanical shifter that changes air flow direction at the piston 148 by actuating the spool valve 151 to switch positions when limit switches are engaged, but it will also be understood that the shifter 153a may be modified in other embodiments, such as to include electronic shifters controlled by various types of sensors. Regardless of the particular structure used with the shifter 153, the pump 56a operates in the same manner as described above to remove melted adhesive from the reservoir 22a via the flow passage 58a and through the combined fluid chamber and manifold 54a.

Although the receiving space 16 and the heater unit 20 are identical to those previously described, the reservoir 22a has also been slightly modified in this embodiment of the dispensing device 10a. Instead of a completely open box-like flow path being formed between the heater unit 20 and the manifold 54a, the reservoir 22a of this embodiment includes a bowl shaped profile with a plurality of fins 135a projecting inwardly from the peripheral wall 126a to increase the surface area that may be heated by the heating element 131 in the manifold 22a.

As noted above, the cyclonic separator unit 14a has also been modified in this embodiment of the adhesive dispensing device 10a. The cyclonic separator unit 14a is shown in more detail in FIGS. 8 and 9. In this regard, many of the various elements that were welded into position on the generally cylindrical pipe 72a have been removed from the generally cylindrical pipe 72a and formed into a removable cyclone cap 310. More particularly, the exhaust pipe 84a and the tangential inlet pipe 80a have been integrally formed or connected to the removable cyclone cap 310. The cyclone cap 310 is configured to be releasably connected to the generally cylindrical pipe 72a so that the cyclone cap 310 may be removed for inspection of the various elements of the cyclonic separator unit 14a when desired. The provision of the cyclone cap 310 also simplifies manufacturing of the cyclonic separator unit 14a because welding the elements into position on the generally cylindrical pipe 72a is no longer necessary.

With continued reference to FIGS. 8 and 9, the generally cylindrical pipe 72a of this embodiment continues to include an interior surface 200 coated with polytetrafluoroethylene and an exterior surface 202 arranged so as to define a pipe inner diameter $ID_P$. The top end 74 of the generally cylindrical pipe 72a now terminates as an open end just like the open bottom end 76, and this enables the insertion of the cyclone cap 310. The cyclone cap 310 is defined by a generally cylindrical cap body 312 having an interior surface 314 (which may be coated with polytetrafluoroethylene) and an exterior surface 316 collectively defining a cyclone cap outer diameter $OD_{CC}$. The cyclone cap outer diameter $OD_{CC}$ is sized to be slightly smaller yet substantially identical to the pipe inner diameter $ID_P$ such that a lower end portion 318 of the cap body 312 may be inserted easily through the top end 74 of the generally cylindrical pipe 72a, while maintaining generally the same inner diameter throughout the entire length of the cyclonic separator unit 14a. An upper end portion 320 of the cap body 312 terminates in a closed end wall 322 that is configured to receive the exhaust pipe 84a as shown in the Figures. Similar to the previous embodiment, the exhaust pipe 84a may be coupled to the closed end wall 322 in various known manners, or the exhaust pipe 84a may be formed by injection molding or a similar method as a unitary piece with the cyclone cap 310. Although not shown in the Figures, the exhaust pipe 84a may include a bent portion or elbow above the closed end wall 322 so that an air filter (not shown) and an exhaust outlet are directed in a desired orientation other than straight upward. It will be understood that other types of filtering the exhaust air may be provided without departing from the scope of the invention.

In a middle of the cyclone cap 310 (e.g., between the upper end portion 320 and the lower end portion 318), a projecting flange 326 extends radially outwardly from the exterior surface 316 of the cap body 312. The projecting flange 326 is formed as a unitary piece with the cap body 312 and is generally solid except for a retention lip groove 328 formed to face upwardly from the projecting flange 326 and a pipe receiving groove 330 formed to face downwardly from the projecting flange 326. When the cyclone cap 310 is positioned with the lower end portion 318 in the generally cylindrical pipe 72a, the top end 74 of the generally cylindrical pipe 72a seats in and abuts the pipe receiving groove 330 on the projecting flange 326. The retention lip groove 328 is configured to interact with one or more retention clips 332 provided near the top end 74 of the generally cylindrical pipe 72a. In this regard, the generally cylindrical pipe 72a includes a plurality of the retention clips 332, each including a holding arm 334 and a locking handle 336 operatively coupled to the holding arm 334. The operation of the retention clips 332 is identical to the well known snap clips used to close various types of containers, for example, by rotating the locking handle 336 to and from the position shown in FIGS. 8 and 9 to engage and disengage the holding arm 334 from the retention lip groove 328. Therefore, this simple retention mechanism may be used to rapidly lock the cyclone cap 310 in the intended position for operation and then to release the cyclone cap 310 for removal during an inspection of the cyclonic separator unit 14a. It will be understood that other types of retention members may be provided on the generally cylindrical pipe 72a without departing from the scope of the invention.

As shown in FIG. 9, the cyclone cap 310 is provided with the sidewall opening 78a that leads to the tangential inlet pipe 80a. The tangential inlet pipe 80a has been modified to have a larger inner diameter $ID_I$ in this embodiment, such as 1.25 inches for example. The tangential inlet pipe 80a also includes bayonet-style locking detents 340 configured to receive corresponding locking structure on the inlet hose leading to the fill system 52. Consequently, this embodiment of the cyclonic separator unit 14a uses a bayonet connection to the inlet hose rather than a separate band clamp, and this enables the connection to be made securely without requiring additional elements like a band clamp or another tool. As a result of the larger tangential inlet pipe 80a, the exhaust pipe 84a and the pipe inner diameter $ID_P$ defined along the length of the cyclonic separator unit 14a have also been modified to be larger, such as 3.50 inches or more. This enables larger sized pellets of adhesive to be used with the adhesive dispensing device 10a. The collective length of the cylindrical pipe 72a and the cyclone cap 310 is shown at $L_{P+CC}$ in FIG. 9, and this length may be modified as needed to ensure a reduction in velocity of the pellets and pressurized air of 50% or more before deposit into the receiving space 16. Consequently, the cyclonic separator unit 14a of this embodiment continues to provide the advantageous benefit of avoiding excessive splashing and build up that could adversely affect future supplies of adhesive into the melt subassembly 12.

The cyclonic separator unit 14a of this embodiment operates in a substantially identical manner as the previous embodiment shown in FIG. 6, so the flow arrows and pellets have not been shown again in view of the detailed description above. To this end, the pellets and pressurized air enter the cyclone cap 310 through the tangential inlet pipe 80a and sidewall opening 78a and then spiral downwardly through the outer annular space portion 220b and into the receiving space 16, while air is exhausted through a central space portion 220a and out through the exhaust pipe 84a. The exhaust pipe 84a extends below the lower end portion 318 of the cyclone cap 310 in the Figures, but the specific length of the exhaust pipe 84a may be modified to be shorter or longer in other embodiments. As noted above, the particular layout and dimensions of the elements in this embodiment of the cyclonic separator unit 14a may be further modified to fit the needs of an end user without departing from the scope of the invention.

While the present invention has been illustrated by a description of several embodiments, and while such embodiments have been described in considerable detail, there is no intention to restrict, or in any way limit, the scope of the appended claims to such detail. Additional advantages and modifications will readily appear to those skilled in the art. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. An adhesive dispensing device comprising:
   a heater unit adapted to melt and heat adhesive material to an elevated application temperature;
   a receiving space defined by at least one sidewall and a top wall having an inlet aperture, said receiving space positioned to feed adhesive material through said heater unit, and said receiving space defining a first horizontal cross-sectional area; and
   a cyclonic separator unit coupled to said at least one sidewall of said receiving space, said cyclonic separator unit including a generally cylindrical pipe including a top end, a bottom end, and an interior surface extending from said top end to said bottom end, said generally cylindrical pipe including defining a second horizontal cross-sectional area along an entire length of said generally cylindrical pipe that is less than the first horizontal cross-sectional area of said receiving space, and said bottom end connected in fluid communication with said receiving space,
   said cyclonic separator unit further including a tangential inlet pipe coupled to the generally cylindrical pipe proximate to said top end, and an exhaust pipe configured to exhaust air flowing into said generally cylindrical pipe and said receiving space,
   said generally cylindrical pipe being adapted to receive a flow of air and adhesive pellets through said tangential inlet pipe to cause a spiral flow of air and adhesive pellets along said interior surface between said top and bottom ends, such that the air and adhesive pellets frictionally engage said interior surface, thereby decelerating the flow of air and adhesive pellets to a lower non-zero speed before deposit within the receiving space, said cyclonic separator unit decelerating the flow of air and adhesive pellets without directly opposing gravitational forces applied to the adhesive pellets, and
   said cyclonic separator unit including no significantly tapered sidewall portions such that said cyclonic separator unit presents an unrestricted flow path between said top and bottom ends to thereby prevent buildup of splashed adhesive from said receiving space and prevent buildup of adhesive caused by directly opposing gravitational forces applied to adhesive pellets during deceleration.

2. The adhesive dispensing device of claim 1, further comprising:
   a reservoir for receiving the adhesive material from said heater unit;
   a pump for directing the adhesive material from said reservoir out of the adhesive dispensing device; and
   a level sensor having an electrically driven electrode mounted along said at least one sidewall of said receiving space such that the amount of adhesive material in said receiving space is detected by a change in dielectric capacitance from said electrically driven electrode to a ground located at said at least one sidewall of said receiving space,
   said level sensor accurately and rapidly sensing when the adhesive material is removed from said receiving space such that additional adhesive material can be delivered to said receiving space and to said heater unit through said cyclonic separator unit to avoid emptying said receiving space and said reservoir during periods of high adhesive flow.

3. The adhesive dispensing device of claim 1, wherein said generally cylindrical pipe further includes a sidewall opening in said interior surface proximate to said top end, and said tangential inlet pipe is coupled to said generally cylindrical pipe at said sidewall opening.

4. The adhesive dispensing device of claim 1, wherein said cyclonic separator unit further comprises:

a cyclone cap engaged with said top end of said generally cylindrical pipe and including said exhaust pipe and said tangential inlet pipe, said cyclone cap being removable as a unit with said exhaust pipe and said tangential inlet pipe to provide access into said generally cylindrical pipe.

5. The adhesive dispensing device of claim 4, wherein said cyclone cap includes a projecting flange defining a retention lip groove, and said generally cylindrical pipe includes at least one retention clip configured to snap into engagement with said projecting flange at said retention lip groove to retain said cyclone cap in position relative to said generally cylindrical pipe.

6. The adhesive dispensing device of claim 1, wherein said generally cylindrical pipe encloses an interior cylindrical space including an inner central space portion aligned with said exhaust pipe and an outer annular space portion surrounding said inner central space portion, and said outer annular space portion receives spiraling flow of air and adhesive pellets moving from said tangential inlet pipe to said bottom end while said inner central space portion receives exhaust flow of air moving from said bottom end to said top end.

7. The adhesive dispensing device of claim 1, wherein said tangential inlet pipe is positioned to cause rotating flow of air and adhesive pellets initially around said exhaust pipe.

8. The adhesive dispensing device of claim 1, wherein said exhaust pipe defines a flow cross section and is configured to receive at least a portion of an air filter adapted to filter exhaust air flow from said generally cylindrical pipe, and said exhaust pipe further includes a metal screen located adjacent to the portion of the air filter when inserted into said exhaust pipe, said metal screen extending across said flow cross section such that exhaust air flow must pass through said metal screen before passing through the air filter.

9. The adhesive dispensing device of claim 1, wherein said generally cylindrical pipe defines an inner diameter that remains constant from said top end to said bottom end.

10. The adhesive dispensing device of claim 1, wherein said receiving space is defined by a hopper including said at least one sidewall.

11. A method for supplying adhesive pellets to a receiving space defining a first horizontal cross-sectional area in an adhesive dispensing device, the method comprising:

delivering a flow of air and adhesive pellets through an inlet hose into a tangential inlet pipe of a cyclonic separator unit coupled to the receiving space;

delivering the flow of air and adhesive pellets through the tangential inlet pipe and into a generally cylindrical pipe of the cyclonic separator unit so as to produce a spiral flow of air and adhesive pellets rotating about an interior surface of the generally cylindrical pipe, the generally cylindrical pipe defining a second horizontal cross-sectional area along an entire length of the generally cylindrical pipe that is less than the first horizontal cross-sectional area;

decelerating the flow of air and adhesive pellets by frictionally contacting the air and adhesive pellets with the interior surface of the generally cylindrical pipe as the air and adhesive pellets rotate in the spiral flow, the decelerating of the flow of air and adhesive pellets being performed without directly opposing gravitational forces applied to the adhesive pellets, the cyclonic separator unit including no significantly tapered sidewall portions such that the cyclonic separator unit presents an unrestricted flow path to thereby prevent buildup of splashed adhesive from the receiving space and prevent buildup of adhesive caused by directly opposing gravitational forces applied to adhesive pellets during deceleration; and depositing the adhesive pellets into the receiving space directly from the generally cylindrical pipe, the adhesive pellets spreading out into the first horizontal cross-sectional area of the receiving space after deposit from the generally cylindrical pipe.

12. The method of claim 11, wherein the cyclonic separator unit includes a cyclone cap including the tangential inlet pipe and an exhaust pipe, and the method further comprises:

removing the cyclone cap with the tangential inlet pipe and the exhaust pipe as a unit from the generally cylindrical pipe to provide access into the generally cylindrical pipe;

engaging the cyclone cap with the generally cylindrical pipe and retaining the cyclone cap in position with a retention clip mounted on the generally cylindrical pipe.

13. The method of claim 11, wherein the generally cylindrical pipe includes a constant diameter along an entire length of the generally cylindrical pipe.

* * * * *